(12) United States Patent
Chen

(10) Patent No.: US 12,026,950 B2
(45) Date of Patent: Jul. 2, 2024

(54) VIDEO PROCESSING METHOD, APPARATUS AND SYSTEM

(71) Applicant: HANGZHOU HIKVISION DIGITAL TECHNOLOGY CO., LTD., Zhejiang (CN)

(72) Inventor: Jia Chen, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 142 days.

(21) Appl. No.: 17/789,481

(22) PCT Filed: Nov. 2, 2020

(86) PCT No.: PCT/CN2020/125839
§ 371 (c)(1),
(2) Date: Jun. 27, 2022

(87) PCT Pub. No.: WO2021/135614
PCT Pub. Date: Jul. 8, 2021

(65) Prior Publication Data
US 2023/0047455 A1    Feb. 16, 2023

(30) Foreign Application Priority Data
Dec. 31, 2019 (CN) .......................... 201911416668.3

(51) Int. Cl.
*G06V 20/52* (2022.01)
*G06V 10/26* (2022.01)
(Continued)

(52) U.S. Cl.
CPC ............. *G06V 20/52* (2022.01); *G06V 10/26* (2022.01); *G06V 20/41* (2022.01); *G06V 20/46* (2022.01); *G11B 27/02* (2013.01)

(58) Field of Classification Search
CPC ........ G06V 20/52; G06V 20/46; G06V 20/41; G06V 10/26; G11B 27/02
See application file for complete search history.

(56) References Cited

U.S. PATENT DOCUMENTS 6,937,730 B1    8/2005   Buxton
8,818,020 B2    8/2014   Guan et al.
(Continued)

FOREIGN PATENT DOCUMENTS

CN    101257558 A    9/2008
CN    101389005 A    3/2009
(Continued)

OTHER PUBLICATIONS

International Search Report Issued in PCT Application No. PCT/CN2020/125839, Jan. 20, 2021 with translation provided by WIPO.
(Continued)

*Primary Examiner* — Mishawn N. Hunter
(74) *Attorney, Agent, or Firm* — Ladas & Parry, LLP

(57) ABSTRACT

The present disclosure provides video processing methods, apparatuses and systems. The method includes: obtaining a to-be-processed video, where the to-be-processed video is obtained by performing feature removal processing for one or more objects in an original video; obtaining a feature restoration processing request for one or more to-be-processed objects; according to the feature restoration processing request for the one or more to-be-processed objects, obtaining feature image information corresponding to the one or more to-be-processed objects, where the feature image information for one of the one or more to-be-processed objects includes pixel position information of all or part of features for the one of the one or more to-be-processed objects in the original video; according to the feature image information for the one or more to-be-processed objects, performing feature restoration processing for
(Continued)

the one or more to-be-processed objects in the to-be-processed video.

20 Claims, 9 Drawing Sheets

(51) Int. Cl.
*G06V 20/40* (2022.01)
*G11B 27/02* (2006.01)

(56) References Cited

U.S. PATENT DOCUMENTS

| | | | |
|---|---|---|---|
| 10,045,087 | B1 | 8/2018 | Ellis et al. |
| 2003/0149879 | A1 | 8/2003 | Tian et al. |
| 2003/0179900 | A1 | 9/2003 | Tian et al. |
| 2011/0150327 | A1 | 6/2011 | Yoo et al. |
| 2012/0141027 | A1 | 6/2012 | Hatakeyama et al. |
| 2019/0022492 | A1* | 1/2019 | Takahashi ............... G06F 17/18 |
| 2019/0261045 | A1 | 8/2019 | Altuev |
| 2020/0265238 | A1* | 8/2020 | Polavarapu ............ G06V 20/20 |
| 2021/0020005 | A1* | 1/2021 | Shimada ............ G08B 13/1963 |

FOREIGN PATENT DOCUMENTS

| | | |
|---|---|---|
| CN | 101610408 A | 12/2009 |
| CN | 101635835 A | 1/2010 |
| CN | 101472161 B | 4/2011 |
| CN | 102332167 A | 1/2012 |
| CN | 103167216 A | 6/2013 |
| CN | 102194204 B | 3/2014 |
| CN | 105405092 A | 3/2016 |
| CN | 106530227 A | 3/2017 |
| CN | 108040230 A | 5/2018 |
| CN | 108206930 A | 6/2018 |
| CN | 108702485 A | 10/2018 |
| CN | 109086670 A | 12/2018 |
| CN | 109670383 A | 4/2019 |
| CN | 109743579 A | 5/2019 |
| CN | 110290945 A | 9/2019 |
| CN | 110430337 A | 11/2019 |
| CN | 111432286 A | 7/2020 |
| EP | 3540620 A1 | 9/2019 |
| KR | 101963042 B1 | 3/2019 |
| RU | 2606056 C2 | 1/2017 |

OTHER PUBLICATIONS

State Intellectual Property Office of the People's Republic of China, 1$^{st}$ Office Action and Search Report Issued in Application No. 2019114166683, Feb. 9, 2021, 18 pages (Submitted with Machine/Partial Translation by Global Dossier).

State Intellectual Property Office of the People's Republic of China, 2$^{nd}$ Office Action and Search Report Issued in Application No. 2019114166683, Nov. 11, 2021, 14 pages (Submitted with Machine/Partial Translation by Global Dossier).

Haiyan Kang et al, "Enhancing privacy for geographic information based on video analysis", Journal of Shandong University (Natural Science) , vol. 53, No. 1,Dec. 22, 2017, 11 pages, with machine translation provided by Google.

Zhixiang Cai et al, "Restoration algorithm for rain video image", Journal of Electronic Measurement and Instrument, vol. 26, No. 6, Jun. 15, 2012, 5 pages, with machine translation provided by Google.

ISA-Written Opinion in PCT Application No. PCT/CN2020/125839, Jan. 20, 2021, WIPO and Examiner opinion translation provided by applicant.

European Patent Office, Extended European Search Report Issued in corresponding EP Application No. 20910798.6, Mar. 22, 2023, 8 pages.

* cited by examiner

VIDEO PROCESSING METHOD, APPARATUS AND SYSTEM

CROSS REFERENCE TO RELATED APPLICATIONS

This application is a US National Phase of a PCT Application No. PCT/CN2020/125839 filed on Nov. 2, 2020, which claims priority to Chinese Patent Application No. 201911416668.3 entitled "VIDEO PROCESSING METHOD, APPARATUS AND SYSTEM" filed on Dec. 31, 2019, the entire contents of which are incorporated herein by reference.

TECHNICAL FIELD

The present disclosure relates to the field of image processing technologies, and in particular to video processing methods, apparatuses and systems.

BACKGROUND

In video monitoring field, it is very important to protect a privacy of a snapped target.

At present, to protect a privacy of a target in an original monitoring video, occlusion processing is usually performed for all targets in the original video. However, in some special scenarios, it is required to perform privacy protection for one or more targets in an original monitoring video and not perform privacy protection for one or more targets but display them normally, or, for a monitoring video with all targets under privacy protection, it is required to display some targets in the monitoring video normally and keep other targets under privacy protection.

Therefore, a video processing method capable of performing privacy protection or normal displaying for specific targets as above is urgently needed.

SUMMARY

Embodiments of the present disclosure provide video processing methods, apparatuses and systems so as to solve the problem of inability to perform privacy protection for one or more specified objects or the problem of inability to perform privacy restoration for one or more specified objects. The technical solutions are described below.

According to a first aspect, there is provided a video processing method, including:

obtaining a to-be-processed video, where the to-be-processed video is obtained by performing feature removal processing for one or more objects in an original video;

obtaining a feature restoration processing request for one or more to-be-processed objects, where the one or more to-be-processed objects are one or more of the one or more objects having been subjected to feature removal processing;

according to the feature restoration processing request for the one or more to-be-processed objects, obtaining feature image information corresponding to the one or more to-be-processed objects, where the feature image information of one of the one or more to-be-processed objects includes pixel position information of all or part of features of the one of the one or more to-be-processed objects in the original video;

according to the feature image information of the one or more to-be-processed objects, performing feature restoration processing for the one or more to-be-processed objects in the to-be-processed video.

According to a second aspect, there is provided a video processing method, including:

obtaining an original video;

obtaining a feature removal processing request for one or more to-be-processed objects, where the one or more to-be-processed objects are at least one object in the original video;

according to the feature removal processing request for the one or more to-be-processed objects, obtaining feature image information corresponding to the one or more to-be-processed objects, where the feature image information of one of the one or more to-be-processed objects includes pixel position information of all or part of features of the one of the one or more to-be-processed objects in the original video;

according to the feature image information of the one or more to-be-processed objects, performing feature removal processing for the one or more to-be-processed objects in the original video.

According to a third aspect, there is provided a video processing apparatus, including:

a first video obtaining module, configured to obtain a to-be-processed video, where the to-be-processed video is obtained by performing feature removal processing for one or more objects in an original video;

a first information obtaining module, configured to obtain a feature restoration processing request for one or more to-be-processed objects, where the one or more to-be-processed objects are one or more of the one or more objects having been subjected to feature removal processing; according to the feature restoration processing request for the one or more to-be-processed objects, obtain feature image information corresponding to the one or more to-be-processed objects, where the feature image information of one of the one or more to-be-processed objects includes pixel position information of all or part of features of the one of the one or more to-be-processed objects in the original video;

a feature restoring module, configured to, according to the feature image information of the one or more to-be-processed objects, perform feature restoration processing for the one or more to-be-processed objects in the to-be-processed video.

According to a fourth aspect, there is provided a video processing apparatus, including:

a second video obtaining module, configured to obtain an original video;

a second information obtaining module, configured to obtain a feature removal processing request for one or more to-be-processed objects, where the one or more to-be-processed objects are at least one object in the original video; according to the feature removal processing request for the one or more to-be-processed objects, obtain feature image information corresponding to the one or more to-be-processed objects, where the feature image information of one of the one or more to-be-processed objects includes pixel position information of all or part of features of the one of the one or more to-be-processed objects in the original video;

a feature removing module, configured to, according to the feature image information of the one or more to-be-processed objects, perform feature removal processing for the one or more to-be-processed objects in the original video.

According to a fifth aspect, there is provided a video processing system, including a management platform and an image management terminal, where, the management platform is configured to: obtain a to-be-processed video, where the to-be-processed video is obtained by performing feature removal processing for one or more objects in an original video; obtain a feature restoration processing request for one or more to-be-processed objects, where the one or more to-be-processed objects are one or more of the one or more objects having been subjected to feature removal processing; according to the feature restoration processing request for the one or more to-be-processed objects, send a feature image information obtaining request for the one or more to-be-processed objects to the image management terminal, where feature image information of one of the one or more to-be-processed objects includes pixel position information of all or part of features of the one of the one or more to-be-processed objects in the original video; obtain the feature image information for the one or more to-be-processed objects sent by the image management terminal; according to the feature image information of the one or more to-be-processed objects, perform feature restoration processing for the one or more to-be-processed objects in the to-be-processed video;

the image management terminal is configured to: obtain the feature image information obtaining request for the one or more to-be-processed objects; according to the feature image information obtaining request for the one or more to-be-processed objects, determine the feature image information of the one or more to-be-processed objects; send the feature image information of the one or more to-be-processed objects to the management platform.

According to a sixth aspect, there is provided a video processing system, including a management platform and an image management terminal, where, the management platform is configured to: obtain an original video; obtain a feature removal processing request for one or more to-be-processed objects, where the one or more to-be-processed objects are at least one object in the original video; according to the feature removal processing request for the one or more to-be-processed objects, send a feature image information obtaining request for the one or more to-be-processed objects to the image management terminal, where feature image information of one of the one or more to-be-processed objects includes pixel position information of all or part of features of the one of the one or more to-be-processed objects in the original video; obtain the feature image information of the one or more to-be-processed objects sent by the image management terminal; according to the feature image information of the one or more to-be-processed objects, perform feature removal processing for the one or more to-be-processed objects in the original video;

the image management terminal is configured to: obtain the feature image information obtaining request for the one or more to-be-processed objects; according to the feature image information obtaining request for the one or more to-be-processed objects, determine the feature image information of the one or more to-be-processed objects; send the feature image information of the one or more to-be-processed objects to the management platform.

According to a seventh aspect, there is provided a computer device, including a processor and a memory, where the memory stores at least one instruction and the at least one instruction is loaded and executed by the processor to implement the video processing method according to the above first aspect and second aspect.

According to an eighth aspect, there is provided a computer readable storage medium, storing at least one instruction, where the at least one instruction is loaded and executed by a processor to implement the video processing method according to the above first aspect and second aspect.

According to a ninth aspect, there is provided a computer program product, where an instruction in the computer program product is loaded and executed by a processor in a computer device to implement the video processing method according to the above first aspect and second aspect.

The technical solutions provided by the embodiments of the present disclosure at least have the following beneficial effects.

In the embodiments of the present disclosure, when processing is performed for one or more objects in the to-be-processed video, a feature restoration processing request for one or more to-be-processed objects is firstly obtained, where the one or more to-be-processed objects are one or more of the objects having been subjected to feature removal processing. Next, according to the feature restoration processing request for the one or more to-be-processed objects, feature image information of the one or more to-be-processed objects may be obtained, where the feature image information of one of the one or more to-be-processed objects includes pixel position information of all or part of features of the one of the one or more to-be-processed objects in the original video. Then, when feature restoration processing is performed for the one or more to-be-processed objects in the to-be-processed video according to the feature image information of the one or more to-be-processed objects, it is not required to perform feature restoration for all objects but only for the one or more to-be-processed objects, thus achieving better privacy protection for other objects in the to-be-processed video.

BRIEF DESCRIPTION OF THE DRAWINGS

In order to more clearly describe the technical solutions of the embodiments of the present disclosure, accompanying drawings required for descriptions of the embodiments will be briefly described. Apparently, the drawings described below are only some embodiments of the present disclosure, and those skilled in the art may obtain other drawings based on these drawings without making inventive work.

DETAILED DESCRIPTION OF THE EMBODIMENTS

To make the objects, technical solutions and advantages of the present disclosure clearer, the embodiments of the present disclosure will be further detailed below in combination with accompanying drawings.

In the related arts, to protect a privacy of a target in an original monitoring video, for all targets of the original monitoring video, occlusion processing may be performed for image regions corresponding to the all targets in video frames, and position information of the image regions having been subjected to occlusion processing is stored. Furthermore, different authority levels may be allocated to users needing to view the monitoring video and only the user having a highest authority can view the un-occluded original monitoring video. To avoid occupying excessive storage space, the original monitoring video will be no longer locally stored after being occluded. In this case, when the user having the highest authority needs to view the monitoring video, the image regions having been subjected to occlusion processing in the monitoring video can be found based on the stored position information of the image regions, and occlusion removal processing is performed for the image regions to obtain the original monitoring video. In the above solution, when privacy protection is performed for a target in the monitoring video, it is required to perform occlusion processing for all targets, and correspondingly, during occlusion removal processing, it is required to perform occlusion removal processing for all targets.

An embodiment of the present disclosure provides a video processing method, which can achieve privacy protection or normal display for a specific target. The method can be implemented by a management platform. The management platform may be a computer device disposed at management side, or a mobile device of a manager. The manager may view a monitoring video within its management scope from an image management terminal through the management platform. The image management terminal may be, for example, a network Video Recorder (NVR). The following embodiments are described with NVR as image management terminal. For the purpose of privacy protection of an object, a manager may perform privacy restoration processing for one or more specified objects in the monitoring video by using the video processing method provided by the embodiments of the present disclosure, thereby the privacy of other objects in the monitoring video will not be leaked.

Figure 1:
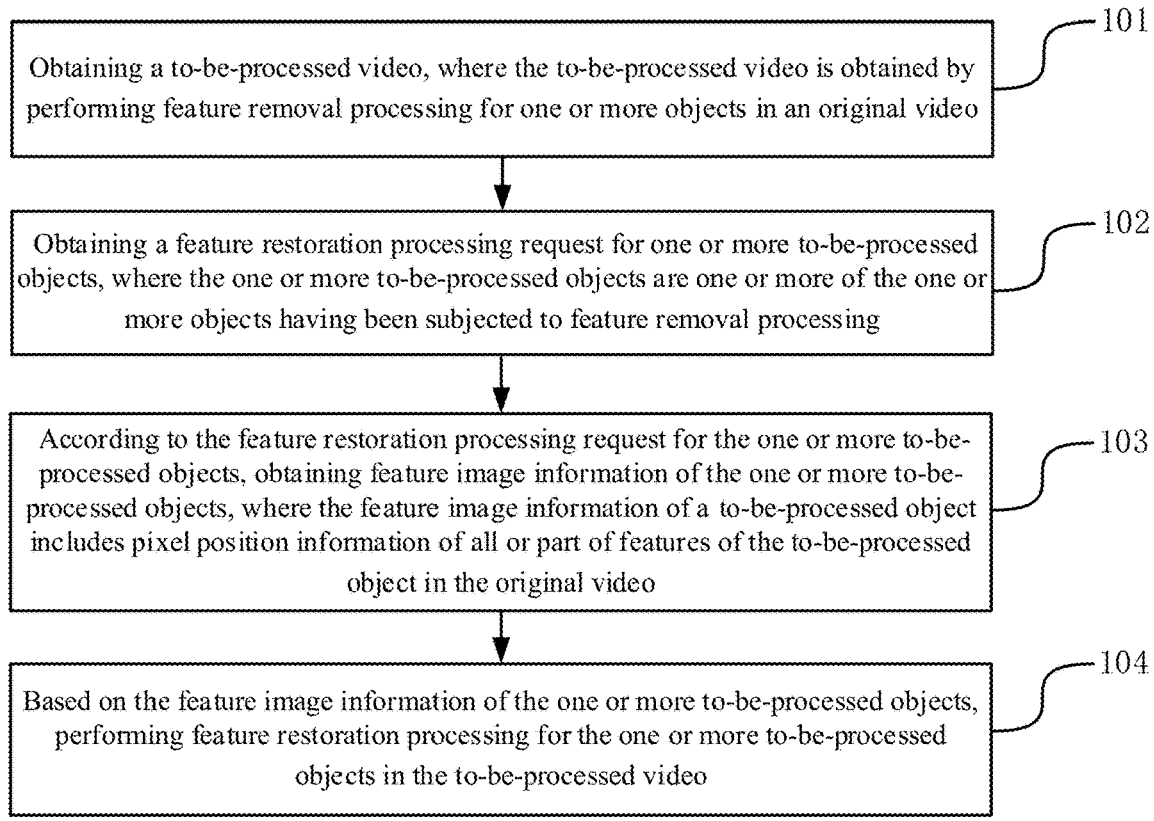
FIG. 1 is a flowchart illustrating a video processing method according to an embodiment of the present disclosure.

As shown in FIG. 1, the flow of the video processing method may include the following steps.

At step 101, a to-be-processed video is obtained.

The to-be-processed video is obtained by performing feature removal processing for one or more objects in an original video. The original video may be a monitoring video snapped by a security protection camera. The monitoring video may be a monitoring video stream snapped in real time, or a stored recorded monitoring video for a specified time period.

In implementation, the management platform may obtain a to-be-processed video from the NVR. Based on different requirements, the to-be-processed video may be obtained in different manners.

For example, when a manager needs to view a behavior of one or more specified objects in a monitoring video snapped by a monitoring device for a region within a time period, the monitoring video of the region within the time period is an original video for the to-be-processed video. By the manager, a to-be-processed video obtaining request can be sent to the NVR through the management platform, where the to-be-processed video obtaining request may include shooting/snapping time information and shooting position information. After obtaining the corresponding monitoring video, the NVR may firstly perform feature removal processing for one or more objects in the monitoring video to obtain a to-be-processed video. Herein, the feature removal processing may include superimposing mosaic image on the one or more objects in the monitoring video, or performing pixel value adjustment or pixel block position adjustment for the one or more objects in the monitoring video. Next, the NVR may send the obtained to-be-processed video to the management platform.

For another example, the NVR may obtain a monitoring video snapped by each monitoring device in real time as an original video and perform feature removal processing for one or more objects in the original video to obtain a to-be-processed video and then directly send the to-be-processed video to the management platform.

For another example, when the above original video is a monitoring video snapped in real time or a stored recorded monitoring video, the NVR may directly send the original video to the management platform which performs feature removal processing for one or more objects in the original video to obtain a to-be-processed video.

At step 102, a feature restoration processing request for one or more to-be-processed objects is obtained, where the one or more to-be-processed objects are one or more of the one or more objects having been subjected to feature removal processing.

In implementation, the management platform may obtain the feature restoration processing request for the one or more to-be-processed objects in many manners, several manners of which will be described below.

In a first manner, the management platform displays one or more images of one or more objects, the one or more objects in the original video corresponding to the to-be-processed video having been subjected to feature removal processing, and obtains a feature restoration processing request for one or more to-be-processed objects triggered by a selection operation for at least one target image, where the at least one target image is at least one of the one or more images displayed on the management platform, the one or more images are images of the one or more objects in the original video corresponding to the to-be-processed video having been subjected to feature removal processing.

When the management platform requests a to-be-processed video from the NVR, the NVR may directly send the original video to the management platform, and the management platform performs object identification for the original video to obtain an image of each object, and performs feature removal processing for one or more objects of the original video to obtain a to-be-processed video. Then, the management platform may display the images of the one or more objects having been subjected to feature removal processing.

Alternatively, when the management platform requests a to-be-processed video from the NVR, the NVR may perform object identification for the original video to obtain a respective image of each object and pixel position information corresponding to one or more objects requiring feature removal processing. Next, the NVR sends the respective image of each object, the pixel position information corresponding to the one or more objects requiring feature removal processing and the original video to the management platform. The management platform performs feature removal processing for the one or more objects in the original video according to the pixel position information corresponding to the one or more objects requiring feature removal processing, so as to obtain the to-be-processed video, and displays the images of the one or more objects having been subjected to feature removal processing.

Alternatively, when the management platform requests a to-be-processed video from the NVR, the NVR may perform object identification for the original video to obtain a respective image of each object, and perform feature removal processing for one or more objects in the original video to obtain the to-be-processed video. Then, the NVR sends the respective image of each object and the to-be-processed video to the management platform. The management platform displays the images of the one or more objects having been subjected to feature removal processing.

Further, it is to be noted that, if the to-be-processed video is obtained by processing a monitoring video snapped in real time, the images of the objects displayed by the management platform may also be updated, for example, by adding an image of a new object or replacing an image of an existing object.

When it is needed to perform feature restoration for one or more to-be-processed objects, the manager only requires to perform a selection operation for one or more images for the one or more to-be-processed objects in the displayed images of the objects so as to trigger a feature restoration processing request for the one or more to-be-processed objects.

In this manner, by displaying the images for the manager to select, the objects appearing in the to-be-processed video can be shown more visually to the manager, and thus the manager can know the objects in the to-be-processed video in real time, helping to perform feature restoration for an interested object, view the position of the interested object and know about what is going on with the interested object.

In a second manner, one or more images for one or more to-be-processed objects are input by a user, that is, a feature restoration processing request for the one or more to-be-processed objects is sent to the management platform.

In the second manner, one or more images for one or more to-be-processed objects are input by the manager. In this case, the manager cannot see objects in the current to-be-processed video and one or more objects can be restored and displayed only if the manager provides accurate images of the one or more objects. In this way, safer and better protection can be provided for the privacy of the objects in the current video.

In a third manner, the management platform may display a to-be-processed video, and the user may perform selection for at least one target image region corresponding to one or more to-be-processed objects in the to-be-processed video to trigger a feature restoration processing request for the one or more to-be-processed objects.

In the third manner, for an interested behavior, the manager can quickly view which object is doing the behavior by performing selection for an image region.

At step 103, according to the feature restoration processing request for the one or more to-be-processed objects, feature image information of the one or more to-be-processed objects is obtained.

The feature image information of one of one or more to-be-processed objects includes pixel position information of all or part of features of the one of the one or more to-be-processed objects in the original video.

In implementation, the management platform may firstly determine an identifier for a to-be-processed object according to the feature restoration processing request for the to-be-processed object, and then obtain the feature image information corresponding to the to-be-processed object based on the identifier for the to-be-processed object.

How to obtain the feature image information corresponding to the one or more to-be-processed objects is described below.

The management platform or the NVR may perform feature removal processing for one or more objects in the original video, and further, the management platform or the NVR may obtain feature image information corresponding to the one or more objects having been subjected to feature removal processing. The feature image information corresponding to the above to-be-processed object is included in the feature image information corresponding to the one or more objects having been subjected to feature restoration processing.

The method by which the management platform or the NVR performs feature removal processing for the one or more objects in the original video will be described below.

Firstly, by using a pre-trained object detection model, object detection is performed for each video frame of the original video to obtain an image of an object in each video frame. The image of the object may be an image within a preset graphic region and including the object, where the preset graphic region may be a rectangular region or a circular region or the like. When the feature image information is pixel position information of all features of an object in the original video, the obtained pixel position information of the image of the object in the video frame may be the feature image information of the object in the video frame. The pixel position information of the image of the object in the video frame may be denoted by pixel coordinates of the specified positions of the preset graphic region corresponding to the image. For example, if the preset graphic region is a rectangular region, the pixel position information may be denoted by pixel coordinates of four vertices of the rectangular region or by a pixel coordinate of an upper left vertex of the rectangular region and length and width of the rectangular region. For another example, if the preset graphic region is a circular region, the pixel position information may be denoted by a pixel coordinate of an origin of the circular region and a radius length of the circular region.

Figure 3:
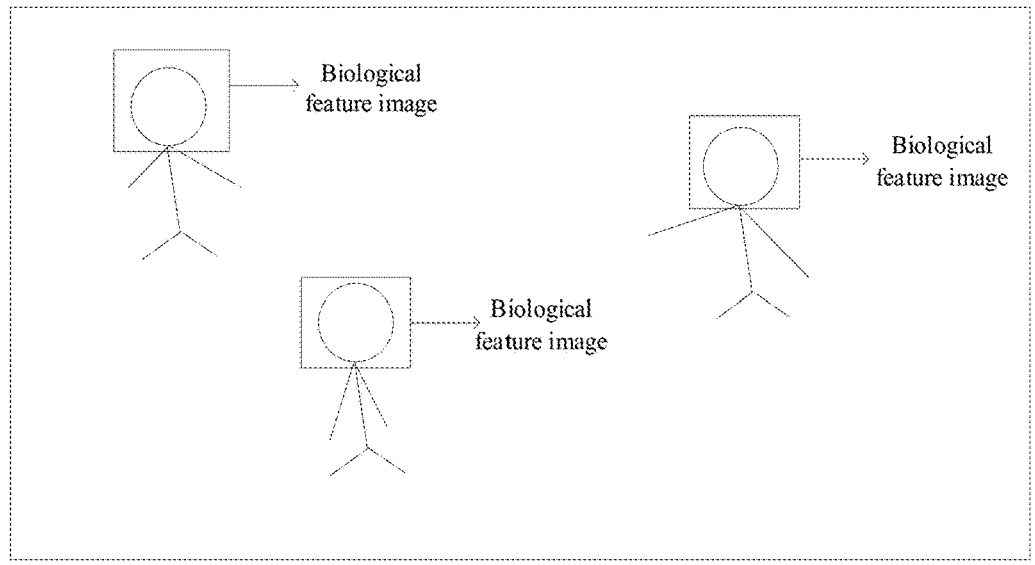
FIG. 3 is a schematic diagram illustrating a video frame according to an embodiment of the present disclosure.

Based on actual requirements, a detected object may be a biological feature of a living body, vehicle license plate, vehicle and identity card and the like. FIG. 3 is a schematic diagram illustrating a biometric image of each living body in one video frame.

Then, by using a pre-trained target matching model, object matching is performed for the images of the objects in different video frames to determine the images belonging to a same object in the different video frames and then feature removal processing is performed for one or more objects requiring feature removal processing.

In the above feature removal processing, an identical identifier may be allocated to a same object and the allocated identifier is an identifier of the object. Further, a correspondence between identifiers of objects and images of objects may also be stored. In addition, each video frame has a corresponding frame identifier, and a same object may correspond to feature image information in multiple video frames of the original video. Thus, the device (such as NRV or management platform) performing feature removal processing for one or more objects of the original video may store a correspondence among identifiers of objects, frame identifiers of video frames and feature image information as shown in Table 1 below.

TABLE 1

| Identifier of object | Frame identifier | Feature image information |
| --- | --- | --- |
| A | Frame 1 | Feature image information 1 |
|   | Frame 2 | Feature image information 2 |
|   | ... | ... |
| B | Frame 1 | Feature image information 3 |
|   | Frame 2 | Feature image information 4 |
|   | ... | ... |
| ... | ... | ... |

If the NVR performs feature removal processing for one or more objects in the original video, when the NVR sends a to-be-processed video to the management platform, the NVR may send the above correspondence between object identifiers and feature image information corresponding to the to-be-processed video to the management platform together with the to-be-processed video, such that the management platform may store the correspondence. Of course, in order to better protect the privacy of the objects in the to-be-processed video, the NVR may locally store the correspondence without sending the correspondence to the management platform. If the management platform performs feature removal processing for one or more objects in the original video, the management platform may locally store the correspondence.

Alternatively, the NVR may locally store the correspondence and not send the correspondence to the management platform but only send the feature image information of the one or more objects requiring feature removal processing and the original video to the management platform. The management platform may then perform feature removal processing for the original video based on the feature image information of the one or more objects requiring feature removal processing to obtain a to-be-processed video. In this way, the privacy of the specified objects in the to-be-processed video can be better protected, and the management platform can also perform privacy restoration for the specified objects by using a corresponding feature restoration method in combination with the previously-used feature removal processing method during subsequent privacy restoration for the specified objects.

In addition, in the first and second manners in which the management platform obtains the feature restoration processing request for the one or more to-be-processed objects in the step 102, when the NVR sends an image of an object to the management platform, the NVR may send the identifier of the object to the management platform together with the image of the object. If the image of the object is obtained by the management platform locally processing the original video, when the image of the object is stored, the identifier of the object may be directly stored correspondingly. In the third manner, the management platform may store a respective image region of each object in each video frame and the identifier of the object correspondingly, that is, correspondingly store a frame identifier of a video frame, an identifier of an object and an image region. Furthermore, the image region may be a rectangular region corresponding to the object and obtained by performing object detection for the original video, which may be denoted by pixel position information of a top left vertex of the rectangular region and its length and width, or denoted by position information of four vertices of the rectangular region.

The manners of determining one or more identifiers of one or more to-be-processed objects will be described below in combination with corresponding manners in which the management platform obtains a feature restoration processing request for one or more to-be-processed objects.

Corresponding to the above first manner, after at least one target image is selected in the displayed images of objects by the manager, the management platform may locally query to obtain at least one object identifier corresponding to the at least one target image as the one or more object identifiers of the one or more to-be-processed objects.

Corresponding to the above second manner, after the one or more images of the one or more to-be-processed objects are input by the manger, for each of the one or more to-be-processed objects, the management platform may perform matching for the stored image of each object having been subjected to feature removal processing in the original video, to obtain a similarity between the image of the to-be-processed object and the stored image of each object, and take the identifier of the object corresponding to the image with the maximum similarity as the identifier of the to-be-processed object.

Corresponding to the above third manner, after selection for is performed for at least one target image region in a video frame by the manager, for each of the at least one target image region, the management platform performs overlapping comparison for the target image region and the stored image region of each object in the video frame and takes an identifier of an object corresponding to the image region with the most overlapping as the identifier of the to-be-processed object for the target image region.

Obtaining the feature image information corresponding to the one or more to-be-processed objects based on the one or more identifiers for the one or more to-be-processed objects will be described below.

When the feature image information of the one or more to-be-processed objects is obtained, if the correspondence between identifiers of objects and feature image information is locally stored, the management platform may directly locally query to obtain the feature image information corresponding to the one or more to-be-processed objects based on the one or more identifiers of the one or more to-be-processed objects. If the correspondence between identifiers of objects and feature image information is stored in the NVR, a feature image information obtaining request including the one or more identifiers of the one or more to-be-processed objects may be sent to the NVR, and the NVR locally queries to obtain the feature image information corresponding to the one or more to-be-processed objects and then sends the feature image information corresponding to the one or more to-be-processed objects to the management platform. When the feature image information corresponding to the one or more to-be-processed objects is queried from the NVR, a computing resource of a Graphics Processing Unit (GPU) in the NVR may be used to speed up the query speed.

At step 104, based on the feature image information of the one or more to-be-processed objects, feature restoration processing is performed for the one or more to-be-processed objects in the to-be-processed video.

In implementation, due to different feature removal processing manners, the feature restoration processing manners will be different.

For the manner of superimposing a mosaic image on the image of the object during feature removal processing: during feature restoration, the mosaic image corresponding to the pixel position information in the feature image information corresponding to the to-be-processed object may be removed.

For the manner of adjusting object pixel value or pixel block position during feature removal processing: the feature image information may also include a pixel value of a pixel block corresponding to the pixel position information in addition to the pixel position information; during feature restoration, a pixel value of a pixel block corresponding to the pixel position information in the feature image information in the to-be-processed video may be adjusted to a pixel value included in the feature image information.

Figure 4:
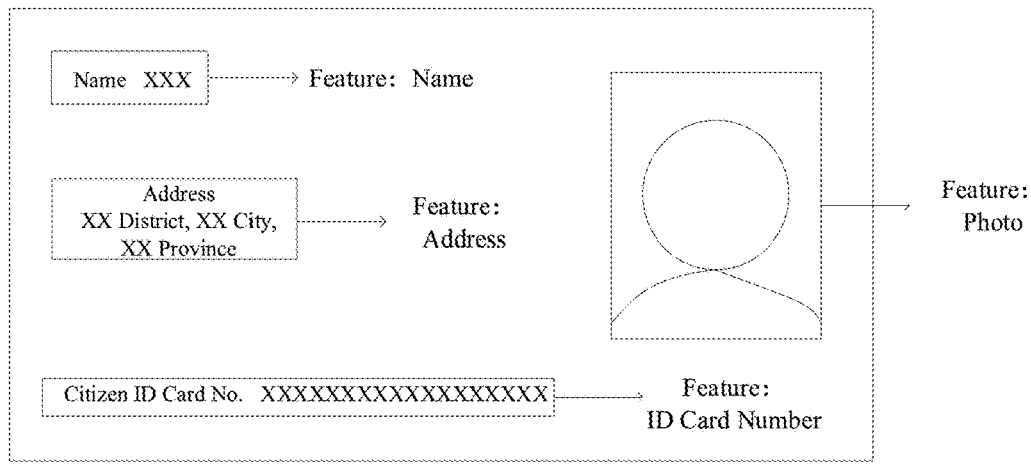
FIG. 4 is a schematic diagram illustrating an object image according to an embodiment of the present disclosure.

In a possible implementation, feature restoration may be performed only for one or more features of an object, that is, in step S103, the feature image information of the object includes pixel position information of one or more features of the object in the original video. Correspondingly, in the manner of performing feature removal processing for an object in the original video in step 103, after images belonging to a same object in different video frames are determined, feature identification may be performed for each image belonging to the same object, to determine feature image information of the features of each image. Alternatively, for each object image belonging to a same object, based on pre-stored relative position information of the object features in the object image, the feature image information of the features of each object image may be determined. For example, for biological features of an object as a living body, identified features may be biological sub-features included in the biological features, and for an object as an identity card, identified features may be photo, identity number, domicile and the like. FIG. 4 is a schematic diagram illustrating different features recognized in an identity card image.

Correspondingly, one feature identifier may be allocated to one category of features, for example, a first biological sub-feature, a second biological sub-feature and a third biological sub-feature of the biological feature may respectively correspond to one identifier. The feature identifiers of the features of same category of different objects may be same, for example, the feature identifier of the first biological sub-feature in the biological features of a living body 1 and the feature identifier of the first biological sub-feature of the biological features of a living body 2 may be same. In this case, the correspondence between object identifiers and feature image information may be expanded as shown in Table 2 below.

When the one or more identifiers of the one or more to-be-processed objects are determined in the above step 103, one or more feature identifiers of the one or more to-be-processed objects may also be determined. Likewise, in combination with the corresponding manners in which the management platform obtains the feature restoration processing request for the one or more to-be-processed objects, the manners of determining the one or more feature identifiers of the one or more to-be-processed objects are described respectively.

Corresponding to the above first manner, after a target image is selected in the displayed images of the objects by the manager, the management platform further displays feature images of the target image, and a target feature image may be selected by the manager. The management platform may take an identifier of the object corresponding to the target image as the identifier of the to-be-processed object, and take a feature identifier corresponding to the target feature image as the feature identifier of the to-be-processed object.

Corresponding to the above second manner, after an image with a maximum similarity with the input image of the to-be-processed object is matched, the management platform further displays feature images of the image, and a target feature image may be selected by the manager. The management platform may take an identifier of the object corresponding to the image with the maximum similarity with the input image of the to-be-processed object as the identifier of the to-be-processed object, and take a feature identifier corresponding to the target feature image as the feature identifier of the to-be-processed object.

Corresponding to the above third manner, after selection is performed for a target image region by the manager, the management platform may determine an image region having the most overlapping with the target image region and then further display feature images of the image and the manager may select a target feature image. The management platform may take an identifier of the object corresponding to the image region with the most overlapping with the target image region as the identifier of the to-be-processed object, and take a feature identifier corresponding to the target feature image as the feature identifier of the to-be-processed object.

TABLE 2

| Identifier of object | Feature identifier | Frame identifier | Feature image information |
|---|---|---|---|
| A | Feature 1 | Frame 1 | Feature image information 11 |
|   |   | Frame 2 | Feature image information 21 |
|   |   | . . . | . . . |
|   | Feature 2 | Frame 1 | Feature image information 12 |
|   |   | Frame 2 | Feature image information 22 |
|   |   | . . . | . . . |
|   | . . . |   | . . . |
| B | Feature 1 | Frame 1 | Feature image information 31 |
|   |   | Frame 2 | Feature image information 41 |
|   |   | . . . | . . . |
|   | Feature 2 | Frame 1 | Feature image information 32 |
|   |   | Frame 2 | Feature image information 42 |
|   |   | . . . | . . . |
| . . . |   |   |   |

Upon acquiring the feature image information of the to-be-processed object, the feature image information of the to-be-processed object may be determined according to both the identifier of the to-be-processed object and the feature identifier of the to-be-processed object. If the correspondence between identifiers of objects and feature image information is locally stored, the management platform may, based on the identifier and the feature identifier of the to-be-processed object, directly locally query to obtain the feature image information corresponding to both the identifier of the to-be-processed object and the feature identifier of the to-be-processed object. If the correspondence between identifiers of objects and feature image information is stored in the NVR, a feature image information acquiring request including the identifier and the feature identifier of the to-be-processed object may be sent to the NVR, and the NVR locally queries to obtain the feature image information corresponding to both the identifier of the to-be-processed object and the feature identifier of the to-be-processed object and then sends the feature image information to the management platform.

Figure 5:
FIG. 5 is a schematic diagram illustrating an object image according to an embodiment of the present disclosure.

When performing feature restoration for the to-be-processed object, the management platform may perform feature restoration only for one or more features of the to-be-processed object. In this way, feature restoration can be achieved for a specified feature of a specified object, so as to avoid leakage of other information of the object. As shown in FIG. 5, the to-be-processed object is an identity card of a person, features to be subjected to feature restoration are photo, name and domicile, but feature restoration is not performed for the identity number of the person. Thus, leakage of the identity number of the person can be avoided.

In a possible implementation, the correspondence between identifiers of objects and feature image information, the correspondence between images of objects and identifiers of objects, and the correspondence between image regions and object identifiers may all be stored in the NVR to management. When required to obtain the feature image information of the to-be-processed object, the management platform may send a feature image information acquiring request for the to-be-processed object to the NVR, where the feature image information acquiring request may only include the image of the object or information of the target image region. For the determination of the identifier of the to-be-processed object and the determination of the feature image information of the to-be-processed object, the NVR may perform these two determination steps and send the determined feature image information corresponding to the to-be-processed object to the management platform.

In a possible implementation, different processing authorities may be set for different levels of managers. The processing authority may include a time period allowed for processing and processed object category etc. The time period allowed for processing may be, for example, Monday to Wednesday, or 3:00 to 5:00 or the like. The object category may be, for example, a living body, an identity card, a vehicle and the like.

Correspondingly, the processing may include following steps: obtaining an account identifier of a target user account currently logging into the management platform, and determining a target processing authority corresponding to the identifier of the target user account. In response to that the target processing authority is capable of processing the feature restoration processing request for the one or more to-be-processed objects, based on the feature image information of the one or more to-be-processed objects, feature restoration processing is performed for the one or more to-be-processed objects in the to-be-processed video.

In implementation, when the manager needs to process a to-be-processed video, the manager may log into the management platform using its own target user account. After the management platform obtains a feature restoration processing request for the one or more to-be-processed objects, the management platform may firstly determine the corresponding target processing authority based on the account identifier of the logged target user account and then based on a stored relationship between processing authority and a time period allowed for processing, determine the time period allowed for processing corresponding to the target processing authority. Then, the management platform may determine whether the obtaining time of the above feature restoration processing request is within the time period allowed for processing corresponding to the target processing authority. If the obtaining time is within the time period allowed for processing, it is determined that the feature restoration processing request satisfies the target processing authority. Further, the operation of obtaining the feature image information of the one or more to-be-processed objects may be performed. In addition, based on the correspondence between processing authority and processable object category, a processable object category corresponding to the target processing authority may be determined. Further, whether the category of the to-be-processed object is the processable object category corresponding to the target processing authority is determined. If the category of the to-be-processed object is the processable object category corresponding to the target processing authority, it is determined that the feature restoration processing request satisfies the target processing authority. Further, the operation of obtaining the feature image information of the to-be-processed object may be performed. Of course, the time period allowed for processing and the processable object category corresponding to the target processing authority can be determined at the same time. If both satisfy the condition, it is allowed to perform the operation of obtaining the feature image information of the to-be-processed object. By this method, the privacy of the object can be better protected.

It is noted herein that the video processing method of the embodiments of the present disclosure can also process the same type of features of multiple objects, for example, process the first biological sub-features of an object A, an object B and an object C. Further, the method can also process multiple different types of objects, for example, process a living body and a vehicle.

In the embodiments of the present disclosure, when processing is performed for one or more objects in a to-be-processed video, a feature restoration processing request for one or more to-be-processed objects is firstly obtained, where the one or more to-be-processed objects are one or more of the one or more objects having been subjected to feature removal processing. Next, according to the feature restoration processing request for the one or more to-be-processed objects, feature image information corresponding to the one or more to-be-processed objects may be obtained, where the feature image information corresponding to one of the one or more to-be-processed objects includes pixel position information of all or part of features of the one of the one or more to-be-processed objects in the original video. Then, when feature restoration processing is performed for the one or more to-be-processed object in the to-be-processed video according to the feature image information of the one or more to-be-processed objects, it is not required to perform feature restoration for all objects but only for the one or more to-be-processed objects, thus achieving better privacy protection for other objects in the to-be-processed video. By applying the method provided by the embodiments of the present disclosure, feature restoration can be quickly achieved for one or more moving target objects in the video.

Figure 2:
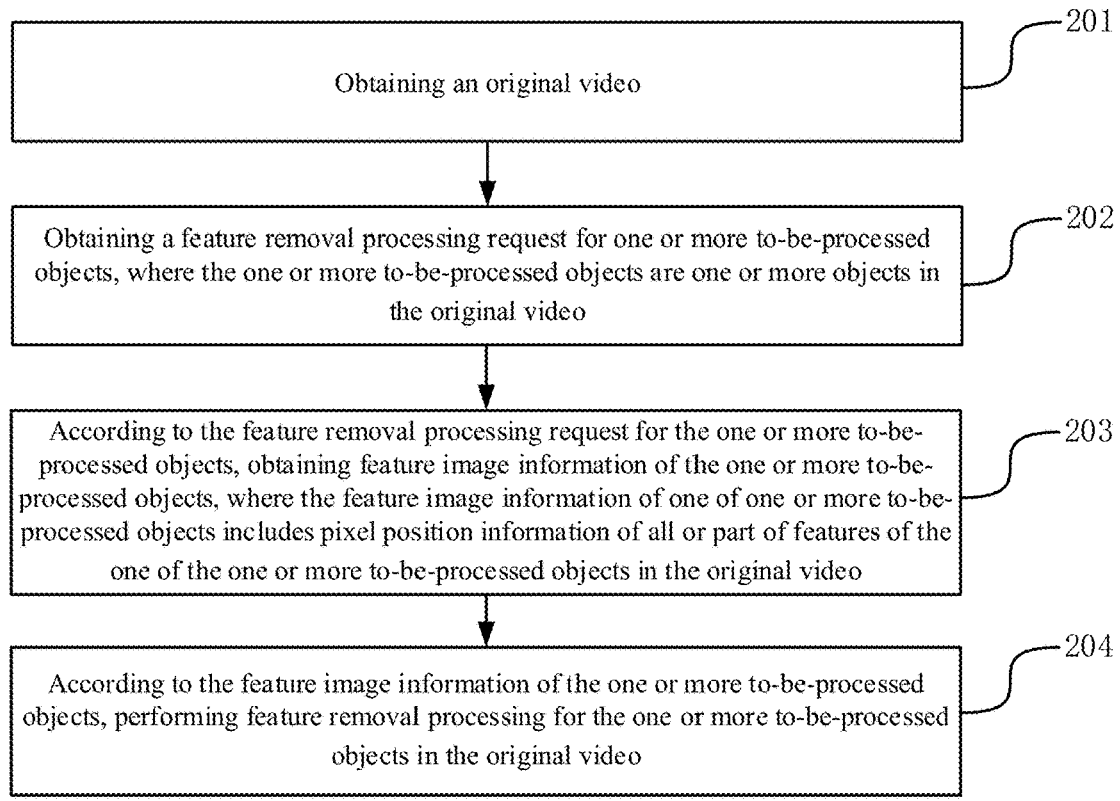
FIG. 2 is a flowchart illustrating a video processing method according to an embodiment of the present disclosure.

As shown in FIG. 2, an embodiment of the present disclosure further provides a video processing method. The processing flow of the method may include the following steps.

At step 201, an original video is obtained.

The original video may be an original monitoring video without feature removal processing, or a video where feature removal processing has been performed for one or more objects. The original video may be a monitoring video snapped in real time or a stored recorded monitoring video.

In implementation, a manager may obtain an original video from an NVR through a management platform while the NVR sends the original video to the management platform.

At step 202, a feature removal processing request for one or more to-be-processed objects is obtained where the one or more to-be-processed objects are one or more objects in the original video.

In implementation, the management platform may obtain the feature removal processing request for the one or more to-be-processed objects in many manners, several manners of which will be described below.

In a first manner, the management platform displays images of objects and obtains a feature removal processing request for one or more to-be-processed objects triggered by a selection operation for at least one target image, where the objects are in the original video.

The management platform may perform object identification for the original video to obtain images of the objects in the original video, or the NVR performs object identification for the original video and sends the original video and the images of the objects in the original video to the management platform. The management platform obtains the images of the objects in the original video and then displays the images of the objects, where the objects are in the original video.

In a second manner, one or more images for one or more to-be-processed objects are input by a user, that is, a feature removal processing request for the one or more to-be-processed objects is sent to the management platform, and the management platform obtains the feature removal processing request for the one or more to-be-processed objects, where the feature removal processing request for the one or more to-be-processed objects includes the one or more images for the one or more to-be-processed objects.

In a third manner, the management platform displays the original video and the user may perform selection for at least one target image region corresponding to the one or more to-be-processed objects in the to-be-processed video to trigger the feature removal processing request for the one or more to-be-processed objects. The management platform obtains the feature removal processing request for the one or more to-be-processed objects triggered by a selection operation for the at least one target image region in the original video.

The specific implementation of the step 202 is similar to the specific implementation of the step 102 in the above embodiment and will not be repeated herein. There is a difference between the two steps that in the step 202, the request obtained by the management platform is a feature removal processing request and the images of the one or more objects displayed by the management platform are the images of the one or more objects not subjected to feature removal processing in the original video.

At step 203, according to the feature removal processing request for the one or more to-be-processed objects, feature image information of the one or more to-be-processed objects is obtained, where the feature image information of one of one or more to-be-processed objects includes pixel position information of all or part of features of the one of the one or more to-be-processed objects in the original video.

In implementation, the management platform may firstly determine one or more identifiers for the one or more to-be-processed objects based on the feature removal processing request for the one or more to-be-processed objects and then obtain the feature image information of the one or more to-be-processed objects based on the one or more identifiers for the one or more to-be-processed objects.

How to obtain the feature image information corresponding to the one or more to-be-processed objects is described below.

Firstly, the management platform or the NVR performs object detection for each video frame in the original video to obtain an image of an object in each video frame. For example, by using a pre-trained object detection model, object detection is performed for each video frame of the original video to obtain an image of an object in each video frame. The image of the object may be an image within a preset graphic region an including the object, where the preset graphic region may be a rectangular region or a circular region or the like. When the feature image information is pixel position information of all features of an object in the original video, the obtained pixel position information of the image of the object in the video frame may be the feature image information of the object in the video frame. The pixel position information of the image of the object in the video frame may be denoted by pixel coordinates of the specified positions of the preset graphic region corresponding to the image. For example, if the preset graphic region is a rectangular region, the pixel position information may be denoted by pixel coordinates of four vertices of the rectangular region or by a pixel coordinate of an upper left vertex of the rectangular region and length and width of the rectangular region. For another example, if the preset graphic region is a circular region, the pixel position information may be denoted by a pixel coordinate of an origin of the circular region and a radius length of the circular region.

Based on actual requirements, a detected object may be a living body, vehicle license plate, vehicle and identity card and the like. Then, by using a pre-trained target matching model, object matching is performed for the images of the one or more objects in different video frames to determine the images belonging to a same object in the different video frames.

In the above processing manner, an identical identifier may be allocated to a same object and the allocated identifier is an identifier of the object. Further, a correspondence between identifiers of objects and images of objects may also be stored. In addition, each video frame has a corresponding frame identifier, and the object may correspond to feature image information in each video frame. Thus, the same object may correspond to the feature image information in multiple video frames in the original video. The device (such as NRV or management platform) performing detection for an object in the original video may store a correspondence among identifiers of objects, frame identifiers of video frames and feature image information.

When the NVR sends an original video to the management platform, the NVR may send the above correspondence between object identifiers and feature image information corresponding to the original video to the management platform together with the original video, such that the management platform may store the correspondence. Of course, in order to better protect the privacy of the objects in the video, the NVR may locally store the correspondence without sending the correspondence to the management platform. If the management platform performs detection for an object in the original video, the management platform may locally store the correspondence.

In addition, in the first and second manners in which the management platform obtains the feature removal processing request for the one or more to-be-processed objects in the step 202, when the NVR sends an image of an object to the management platform, the NVR may send the identifier of the object to the management platform together with the image of the object. If the image of the object is obtained by the management platform by locally processing the original video, when the image of the object is stored, the identifier of the object may be directly stored correspondingly. In the third manner, the management platform may store an image region of each object in each video frame and the identifier of the object correspondingly, that is, correspondingly store frame identifiers of video frames, identifiers of objects and image regions.

The manners of determining one or more identifiers of one or more to-be-processed objects will be described below in combination with corresponding manners in which the management platform obtains a feature removal processing request for one or more to-be-processed objects.

Corresponding to the above first manner, after at least one target image is selected in the displayed images of objects by the manager, the management platform may locally query to obtain at least one object identifier corresponding to the at least one target image as the one or more object identifiers of the one or more to-be-processed objects.

Corresponding to the above second manner, after the one or more images for the one or more to-be-processed objects are input by the manager, for each of the one or more to-be-processed objects, the management platform may perform matching for the stored image of each object in the original video to obtain a similarity between the image of the to-be-processed object and the stored image of each object, and take the identifier of the object corresponding to the image with the maximum similarity as the identifier of the to-be-processed object.

Corresponding to the above third manner, after the manager performs selection for at least one target image region in a video frame, for each of the at least one target image region, the management platform performs overlapping comparison for the target image region and the stored image region of each object in the video frame, and takes an identifier of an object corresponding to the image region with the most overlapping as the identifier of the to-be-processed object for the target image region.

Obtaining the feature image information corresponding to the one or more to-be-processed objects based on the one or more identifiers of the one or more to-be-processed objects will be described below.

Upon acquiring the feature image information of the one or more to-be-processed objects, if the correspondence between identifiers of objects and feature image information is locally stored, the management platform may directly locally query to obtain the feature image information corresponding to the one or more to-be-processed objects based on the one or more identifiers of the one or more to-be-processed objects. If the correspondence between identifiers of objects and feature image information is stored in the NVR, a feature image information obtaining request including the one or more identifiers of the one or more to-be-processed objects may be sent to the NVR, and the NVR locally queries to obtain the feature image information corresponding to the one or more to-be-processed objects and then sends the feature image information to the management platform.

The specific implementation of the step 203 is similar to the specific implementation of the step 103 in the above embodiment. The specific descriptions of the step 203 may be referred to related parts of the step 103 and will not be repeated herein.

At step 204, according to the feature image information of the one or more to-be-processed objects, feature removal processing is performed for the one or more to-be-processed objects in the original video.

In implementation, the management platform may adjust a position of a pixel block corresponding to the pixel position information of the to-be-processed object in the original video, where the adjustment may be random adjustment or adjustment based on preset rule, which will not be limited in the embodiments of the present disclosure. Further, adjustment may be made to a pixel value of a pixel block corresponding to the pixel position information of the to-be-processed object in the original video, where the adjustment may be adjustment to a random pixel value or to a preset pixel value, which will not be limited in the embodiments of the present disclosure. Further, a mosaic image may be superimposed on an image corresponding to the pixel position information of the to-be-processed object in the original video.

In a possible implementation, feature removal may be performed only for one or more features of an object. That is, in step 203, the feature image information of the object includes pixel position information of one or more features of the object in the original video. Specifically, similar to related parts of the embodiment corresponding to FIG. 1, brief descriptions may be made below by referring to the descriptions of related parts of the embodiment corresponding to FIG. 1.

Specifically, in the above step 203, after images belonging to a same object in different video frames are determined, feature identification may be performed for each image belonging to the same object to determine feature image information of the features of each image. Alternatively, for each object image belonging to a same object, based on pre-stored relative position information of the object features in the object image, the feature image information of the features of each object image may be determined. For example, for biological features of an object as a living body, identified features may be biological sub-features included in the biological features, and for an object as an identity card, identified features may be photo, identity number, domicile and the like.

Correspondingly, one feature identifier may be allocated to one category of features, for example, a first biological sub-feature, a second biological sub-feature and a third biological sub-feature of the biological feature may respectively correspond to one identifier.

When the one or more identifiers of the one or more to-be-processed objects are determined in the above step 203, one or more feature identifiers of the one or more to-be-processed objects may also be determined. Likewise, in combination with the corresponding manners in which the management platform obtains the feature removal processing request for the one or more to-be-processed objects, the manners of determining the one or more feature identifiers of the one or more to-be-processed objects are described respectively.

Corresponding to the above first manner, after a target image is selected in the displayed images of the objects by the manager, the management platform further displays feature images of the target image, and a target feature image may be selected by the manager. The management platform may take an identifier of the object corresponding to the target image as the identifier of the to-be-processed object, and take a feature identifier corresponding to the target feature image as the feature identifier of the to-be-processed object.

Corresponding to the above second manner, after an image with a maximum similarity with the input image of the to-be-processed object is matched, the management platform further displays feature images of the image, and a target feature image may be selected by the manager. The management platform may take an identifier of the object corresponding to the image with the maximum similarity with the input image of the to-be-processed object as the identifier of the to-be-processed object, and take a feature identifier corresponding to the target feature image as the feature identifier of the to-be-processed object.

Corresponding to the above third manner, after the manager performs selection for a target image region, the management platform may determine an image region having the most overlapping with the target image region and then further display feature images of the image and the manager may select a target feature image. The management platform may take an identifier of the object corresponding to the image region with the most overlapping with the target image region as the identifier of the to-be-processed object, and take a feature identifier corresponding to the target feature image as the feature identifier of the to-be-processed object.

Upon acquiring the feature image information of the one or more to-be-processed objects, for each of the one or more to-be-processed objects, the feature image information for the to-be-processed object may be determined based on both the object identifier of the to-be-processed object and the feature identifier of the to-be-processed object. If the correspondence between object identifiers of objects and feature image information of the objects is locally stored, the management platform may directly locally query to obtain the feature image information corresponding to both of the object identifier of the to-be-processed object and the feature identifier of the to-be-processed object based on the object identifier of the to-be-processed object and the feature identifier of the to-be-processed object. If the correspondence between object identifiers of objects and feature image information is stored in the NVR, a feature image information obtaining request including the object identifiers and the feature identifiers of the one or more to-be-processed objects may be sent to the NVR, and for each of the one or more to-be-processed objects, the NVR locally queries to obtain the feature image information corresponding to both the object identifier of the to-be-processed object and the feature identifier of the to-be-processed object and then sends the feature image information to the management platform.

When the management platform performs feature removal for a to-be-processed object, feature removal may be performed only for one or more features of the to-be-processed object. In this way, when a user views a feature-removed video, the user may roughly know about what content is at the position of the feature removal, thus helping the user to perform feature restoration processing for the feature-removed video specifically based on actual requirements.

In a possible implementation, the correspondence between identifiers of objects and feature image information, the correspondence between images of objects and identifiers of objects, and the correspondence between image regions and object identifiers may all be stored in the NVR to management. When required to obtain the feature image information of the to-be-processed object, the management platform may send a feature image information obtaining request for the to-be-processed object to the NVR, where the feature image information obtaining request may only include the image of the object or information of the target image region. For the determination of the identifier of the to-be-processed object and the determination of the feature image information of the to-be-processed object, the NVR may perform these two determination steps and send the determined feature image information corresponding to the to-be-processed object to the management platform.

In a possible implementation, different processing authorities may be set for different levels of managers. The processing authority may include a time period allowed for processing and processed object category etc. Correspondingly, the processing may include following steps: obtaining an account identifier of a target user account currently logging into the management platform, and determining a target processing authority corresponding to the identifier of the target user account. In response to that the target processing authority is capable of processing the feature removal processing request for the one or more to-be-processed objects, based on the feature image information of the one or more to-be-processed objects, feature removal processing is performed for the one or more to-be-processed objects in the original video. Specifically, similar to related parts of the embodiment corresponding to FIG. 1, reference may be made to the descriptions of related parts of the embodiment corresponding to FIG. 1 and no redundant descriptions are made herein.

In the embodiments of the present disclosure, when processing is performed for one or more objects in an original video, a feature removal processing request for one or more to-be-processed objects is firstly obtained. Next, according to the feature removal processing request for the one or more to-be-processed objects, feature image information corresponding to the one or more to-be-processed objects may be obtained, where the feature image information corresponding to one of the one or more to-be-processed objects includes pixel position information of all or part of features of the one of the one or more to-be-processed objects in the original video. Then, when feature removal processing is performed for the one or more to-be-processed objects in the original video according to the feature image information of the one or more to-be-processed objects, it is not required to perform feature removal for all objects but only for the specified one or more objects, thus achieving better privacy protection for the specified one or more objects. Further, in combination with user requirements, privacy protection may be performed for the specified one or more objects specifically. By applying the method provided by the embodiments of the present disclosure, feature removal can be quickly performed for one or more specified moving target objects in the video.

Figure 6:
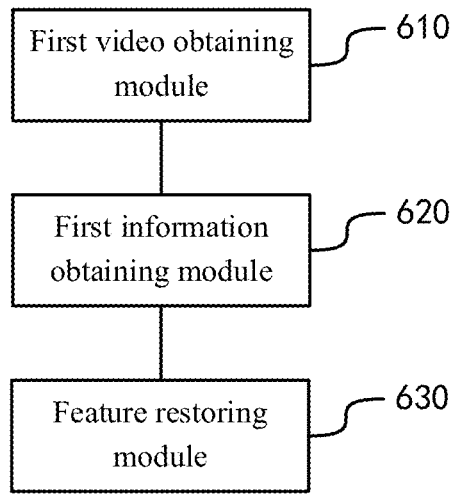
FIG. 6 is a structural schematic diagram illustrating a video processing apparatus according to an embodiment of the present disclosure.

Based on the same technical idea, an embodiment of the present disclosure further provides a video processing apparatus. The apparatus may be a management platform in the above embodiments. As shown in FIG. 6, the apparatus includes a first video obtaining module 610, a first information obtaining module 620 and a feature restoring module 630.

The first video obtaining module 610 configured to obtain a to-be-processed video, where the to-be-processed video is obtained by performing feature removal processing for one or more objects in an original video.

The first information obtaining module 620 is configured to: obtain a feature restoration processing request for one or more to-be-processed objects, wherein the one or more to-be-processed objects are one or more of the one or more objects having been subjected to feature removal processing; according to the feature restoration processing request for the one or more to-be-processed objects, obtain feature image information corresponding to the one or more to-be-processed objects, where the feature image information of one of the one or more to-be-processed objects includes pixel position information of all or part of features of the one of the one or more to-be-processed objects in the original video.

The feature restoring module 630 is configured to, according to the feature image information of the one or more to-be-processed objects, perform feature restoration processing for the one or more to-be-processed objects in the to-be-processed video.

In a possible implementation, the first information obtaining module 620 is configured to:
according to the feature restoration processing request for the one or more to-be-processed objects, determine one or more object identifiers of the one or more to-be-processed objects;
obtain feature image information corresponding to one or more object identifiers of the one or more to-be-processed objects.

In a possible implementation, the first information obtaining module 620 is configured to:
display images of objects having been subjected to feature removal processing, where the objects are in the original video;
obtain the feature restoration processing request for the one or more to-be-processed objects triggered by a selection operation for at least one target image;
obtain at least one object identifier for the at least one target image as one or more object identifiers of the one or more to-be-processed objects.

In a possible implementation, the first information obtaining module 620 is configured to:
obtain the feature restoration processing request for one or more to-be-processed objects, wherein the feature restoration processing request for the one or more to-be-processed objects includes at least one image including the one or more to-be-processed objects;
for each of the one or more to-be-processed objects, in the stored images of objects, the objects being in the original video, determine a target image having a maximum similarity with the image including the to-be-processed object and obtain an object identifier for the target image as the object identifier for the to-be-processed object.

In a possible implementation, the first information obtaining module 620 is configured to:
display the to-be-processed video;
obtain the feature restoration processing request for the one or more to-be-processed objects triggered by a selection operation for at least one target image region in the to-be-processed video;
according to a stored correspondence between object identifiers and image regions, take at least one object identifier corresponding to the at least one target image region as one or more object identifiers for the one or more to-be-processed objects.

In a possible implementation, the first information obtaining module 620 is further configured to:
obtain one or more feature identifiers of the one or more to-be-processed objects;
where obtaining the feature image information corresponding to the one or more object identifiers of the one or more to-be-processed objects includes:
for each of the one or more to-be-processed objects, obtaining the feature image information corresponding to both the object identifier of the to-be-processed object and the feature identifier of the to-be-processed object.

In a possible implementation, the first information obtaining module 620 is configured to:
according to a stored correspondence between object identifiers of objects in the original video and feature image information of the objects, determine the feature image information corresponding to the one or more object identifiers of the one or more to-be-processed objects; or,
send the one or more object identifiers of the one or more to-be-processed objects to an image management terminal, such that the image management terminal determines the feature image information corresponding to the one or more object identifiers of the one or more to-be-processed objects according to a stored correspondence between object identifiers of objects in the original video and feature image information of the objects; and receive the feature image information corresponding to the one or more object identifiers of the one or more to-be-processed objects sent by the image management terminal.

In a possible implementation, the first information obtaining module 620 is configured to:
according to the feature restoration processing request for the one or more to-be-processed objects, send a feature image information obtaining request for the one or more to-be-processed objects to the image management terminal, where the feature image information obtaining request is used to instruct the image management terminal to send the feature image information corresponding to the one or more to-be-processed objects;
receive the feature image information of the one or more to-be-processed objects.

In a possible implementation, the apparatus further includes:
a first managing module, configured to obtain an account identifier of a target user account currently logging into the management platform;
wherein the first information obtaining module 620 is further configured to:
determine a target processing authority corresponding to the identifier of the target user account;
the feature restoring module 630 is configured to:
in response to that the target processing authority is capable of processing the feature restoration processing request for the one or more to-be-processed objects, according to the feature image information of the one or more to-be-processed objects, perform feature restoration processing for the one or more to-be-processed objects in the to-be-processed video.

The specific manner in which each module in the apparatus of the above embodiments performs operations has already been detailed in the method embodiments and thus will not be repeated herein.

It is noted that, the video processing apparatus provided by the above embodiments is illustrated only with the above division of functional modules during video processing and in actual applications, the above functions may be allocated to different functional modules for completion based on requirements, that is, the internal structure of the apparatus is divided into different functional modules to complete all or part of the functions as described above. Furthermore, the video processing apparatus provided by the above embodiments is based on the same idea as the above embodiments of the video processing method and its specific implementation may be referred to the method embodiments and will not be repeated herein.

Figure 7:
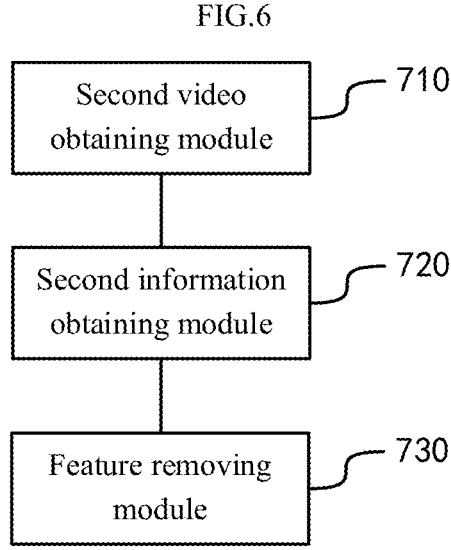
FIG. 7 is a structural schematic diagram illustrating a video processing apparatus according to an embodiment of the present disclosure.

Based on the same technical idea, an embodiment of the present disclosure further provides a video processing apparatus. The apparatus may be a management platform in the above embodiments. As shown in FIG. 7, the apparatus includes a second video obtaining module 710, a second information obtaining module 720 and a feature removing module 730.

The second video obtaining module 710 is configured to obtain an original video;
the second information obtaining module 720 is configured to obtain a feature removal processing request for one or more to-be-processed objects, where the one or more to-be-processed objects are at least one object in the original video; according to the feature removal processing request for the one or more to-be-processed objects, obtain feature image information corresponding to the one or more to-be-processed objects, where the feature image information of one of the one or more to-be-processed objects includes pixel position information of all or part of features of the one of the one or more to-be-processed objects in the original video;
the feature removing module 730 is configured to, according to the feature image information of the one or more to-be-processed objects, perform feature removal processing for the one or more to-be-processed objects in the original video.

In a possible implementation, the second information obtaining module 720 is configured to:
according to the feature removal processing request for the one or more to-be-processed objects, determine one or more object identifiers of the one or more to-be-processed objects;
obtain feature image information corresponding to the one or more object identifiers of the one or more to-be-processed objects.

In a possible implementation, the second information obtaining module 720 is configured to:
display images of objects, where the objects are in the original video; obtain the feature removal processing request for the one or more to-be-processed objects triggered by a selection operation for at least one target image; obtain at least one object identifier for the at least one target image as one or more object identifiers of the one or more to-be-processed objects.

In a possible implementation, the second information obtaining module 720 is configured to
obtain the feature removal processing request for one or more to-be-processed objects, where the feature removal processing request for the one or more to-be-processed objects includes at least one image including the one or more to-be-processed objects; in the stored images of the objects, the objects being in the original video, determine a target image having a maximum similarity with the image including one of the one or more to-be-processed objects and obtain an object identifier for the target image as the object identifier of the one of the to-be-processed objects.

In a possible implementation, the second information obtaining module 720 is configured to:
display the original video; obtain the feature removal processing request for the one or more to-be-processed objects triggered by a selection operation for at least one target image region in the original video; according to a stored correspondence between object identifiers and image regions, take at least one object identifier corresponding to the at least one target image region as one or more object identifiers of the one or more to-be-processed objects.

In a possible implementation, the second information obtaining module 720 is further configured to:
obtain one or more feature identifiers of the one or more to-be-processed objects;
where obtaining the feature image information corresponding to the one or more object identifiers of the one or more to-be-processed objects includes:
for each of the one or more to-be-processed objects, obtaining the feature image information corresponding to both the object identifier of the to-be-processed object and the feature identifier of the to-be-processed object.

In a possible implementation, the second information obtaining module 720 is further configured to:
according to a stored correspondence between object identifier of objects in the original video and feature image information of the objects, determine the feature image information corresponding to the one or more object identifiers of the one or more to-be-processed objects; or,
send the one or more object identifiers of the one or more to-be-processed objects to an image management terminal, such that the image management terminal determines the feature image information corresponding to the one or more object identifiers of the one or more to-be-processed objects according to a stored correspondence between object identifiers of objects in the original video and feature image information of the objects; and receive the feature image information corresponding to the one or more object identifiers of the one or more to-be-processed objects sent by the image management terminal.

In a possible implementation, the second information obtaining module 720 is further configured to:
based on the feature removal processing request for the one or more to-be-processed objects, send a feature image information obtaining request to the image management terminal, where the feature image information obtaining request is used to instruct the image management terminal to send the feature image information corresponding to the one or more to-be-processed objects;
receive the feature image information of the one or more to-be-processed objects.

In a possible implementation, the apparatus further includes:
a second managing module, configured to obtain an account identifier of a target user account currently logging into the management platform;

wherein the second information obtaining module 720 is configured to:

determine a target processing authority corresponding to the identifier of the target user account;

the feature removing module 730 is configured to:

in response to that the target processing authority is capable of processing the feature removal processing request for the one or more to-be-processed objects, according to the feature image information of the one or more to-be-processed objects, perform feature removal processing for the one or more to-be-processed objects in the original video.

The specific manner in which each module in the apparatus of the above embodiments performs operations has already been detailed in the method embodiments and thus will not be repeated herein.

It is noted that, the video processing apparatus provided by the above embodiments is illustrated only with the above division of functional modules during video processing and in actual applications, the above functions may be allocated to different functional modules for completion based on requirements, that is, the internal structure of the apparatus is divided into different functional modules to complete all or part of the functions as described above. Furthermore, the video processing apparatus provided by the above embodiments is based on the same idea as the above embodiments of the video processing method and its specific implementation may be referred to the method embodiments and will not be repeated herein.

Figure 8:
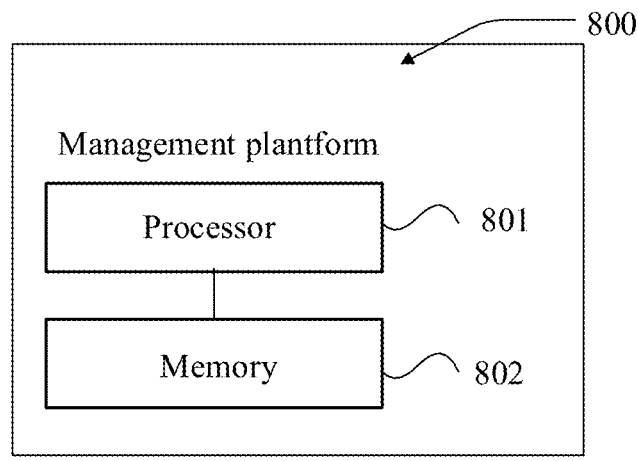
FIG. 8 is a structural schematic diagram illustrating a management platform according to an embodiment of the present disclosure.

FIG. 8 is a structural schematic diagram illustrating a computer device according to an embodiment of the present disclosure. The computer device may be the management platform in the above embodiments. The management platforms 800 may differ greatly due to different configurations or performances. The management platform 800 may include one or more central processing unit (CPU) 801 and one or more memories 802, where the memory 802 stores at least one instruction which is loaded and executed by the processor 801 to implement any one of the above video processing methods.

Based on the same technical idea, an embodiment of the present disclosure further provides a video processing system, including a management platform and an image management terminal, where, the management platform is configured to: obtain a to-be-processed video, where the to-be-processed video is obtained by performing feature removal processing for one or more objects in an original video; obtain a feature restoration processing request for one or more to-be-processed objects, wherein the one or more to-be-processed objects are one or more of the one or more objects having been subjected to feature removal processing; according to the feature restoration processing request for the one or more to-be-processed objects, send a feature image information obtaining request for the one or more to-be-processed objects to the image management terminal, where feature image information of one of the one or more to-be-processed objects includes pixel position information of all or part of features of the one of the one or more to-be-processed objects in the original video; obtain the feature image information of the one or more to-be-processed objects sent by the image management terminal; according to the feature image information of the one or more to-be-processed objects, perform feature restoration processing for the one or more to-be-processed objects in the to-be-processed video;

The image management terminal is configured to: obtain the feature image information obtaining request for the one or more to-be-processed objects; according to the feature image information obtaining request for the one or more to-be-processed objects, determine the feature image information for the one or more to-be-processed objects; send the feature image information of the one or more to-be-processed objects to the management platform.

In a possible implementation, the management platform is configured to:

according to the feature restoration processing request for the one or more to-be-processed objects, determine one or more object identifiers of the one or more to-be-processed objects and send the feature image information obtaining request for the one or more to-be-processed objects to the image management terminal, where the feature image information obtaining request for the one or more to-be-processed objects includes one or more object identifiers of the one or more to-be-processed objects;

wherein the image management terminal is configured to, according to a stored correspondence between object identifiers of objects in the original video and feature image information of the objects, determine the feature image information corresponding to one or more object identifiers of the one or more to-be-processed objects; send the feature image information corresponding to the one or more object identifiers of the one or more to-be-processed objects to the management platform.

In a possible implementation, the management platform is configured to:

display images of the objects, where the objects are in the original video; obtain the feature restoration processing request for the one or more to-be-processed object triggered by a selection operation for at least one target image; obtain at least one object identifier for the at least one target image as one or more object identifiers of the one or more to-be-processed objects; or, obtain the feature restoration processing request for the one or more to-be-processed objects, where the feature restoration processing request for the one or more to-be-processed objects includes at least one image including the one or more to-be-processed objects; and for each of the one or more to-be-processed objects, in the stored images of the objects, the objects being in the original video, determine a target image having a maximum similarity with the image including the to-be-processed object and obtain an object identifier for the target image as an object identifier of the to-be-processed object; or, display the to-be-processed video; obtain the feature restoration processing request for the one or more to-be-processed object triggered by a selection operation for at least one target image region in the original video; according to a stored correspondence between object identifiers and image regions, take at least one object identifier corresponding to the at least one target image region as one or more object identifiers of the one or more to-be-processed objects.

In a possible implementation, the management platform is further configured to:

obtain a feature identifier of the one or more to-be-processed objects;

wherein the feature image information obtaining request for the one or more to-be-processed objects further includes one or more feature identifiers of the one or more to-be-processed objects;

wherein the image management terminal is configured to:
according to a stored correspondence between object identifiers of objects in the original video, feature identifiers of the objects and feature image information of the objects, for each of the one or more to-be-processed objects, determine the feature image information corresponding to both the object identifier of the to-be-processed object and the feature identifier of the to-be-processed object.

Figure 9:
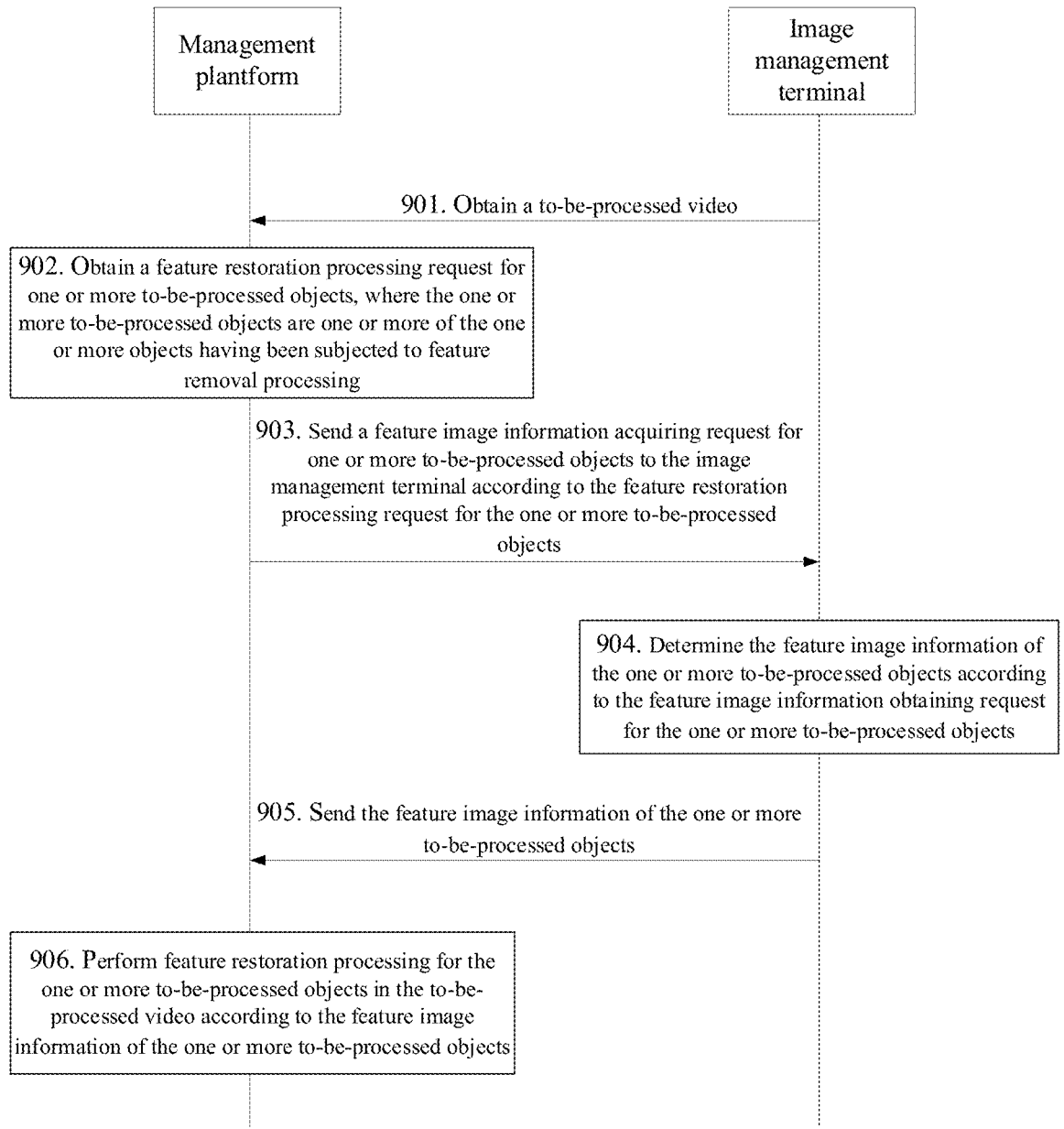
FIG. 9 is a flowchart illustrating a video processing method according to an embodiment of the present disclosure.

In combination with FIG. 9, the processing flow of the management platform and the image management terminal in the above system will be described below.

At step 901, the management platform obtains a to-be-processed video.

In implementation, the management platform may obtain the to-be-processed video from the image management terminal, where the to-be-processed video is obtained by performing feature removal processing for one or more objects in an original video.

At step 902, the management platform obtains a feature restoration processing request for one or more to-be-processed objects, where the one or more to-be-processed objects are one or more of the one or more objects having been subjected to feature removal processing.

In implementation, the management platform may obtain the feature restoration processing request for the one or more to-be-processed objects in many manners. For example, the management platform may display images of the objects, where the objects being in the original video, and obtain a feature restoration processing request for the one or more to-be-processed objects triggered by a selection operation for at least one target image. For another example, the management platform may display the to-be-processed video and obtain the feature restoration processing request for the one or more to-be-processed objects triggered by a selection operation for at least one target image region in the to-be-processed video. For another example, the management platform may obtain one or more images input by a user as the feature restoration processing request for the one or more to-be-processed objects.

At step 903, the management platform sends a feature image information acquiring request for the one or more to-be-processed objects to the image management terminal according to the feature restoration processing request for the one or more to-be-processed objects.

In implementation, the management platform may, after obtaining the feature restoration processing request for the one or more to-be-processed objects, directly send the feature image information acquiring request for the one or more to-be-processed objects to the image management terminal. Herein, due to different manners of obtaining the feature restoration processing request for the one or more to-be-processed objects, the information included in the sent feature image information obtaining request may also be different. For example, when the management platform obtains the feature restoration processing request for the one or more to-be-processed objects triggered by a selection operation for at least one target image, or obtains the feature restoration processing request for the one or more to-be-processed objects by obtaining one or more images input by a user, the feature image information acquiring request may include one or more images for the one or more to-be-processed objects. For example, when the management platform obtains the feature restoration processing request for one or more to-be-processed objects triggered by a selection operation for at least one target image region in the original video, the feature image information obtaining request may include the at least one target image region. Preferably, the management platform may determine an identifier for the one or more to-be-processed objects based on the obtained feature restoration processing request for to-be-processed object, and the feature image information obtaining request sent by the management platform to the image management terminal may include one or more identifiers of the one or more to-be-processed objects.

At step 904, the image management terminal determines the feature image information of the one or more to-be-processed objects according to the feature image information obtaining request for the one or more to-be-processed objects.

In implementation, the image management terminal may determine one or more object identifiers for the one or more to-be-processed objects according to the at least one image for the one or more to-be-processed objects or the at least one target image region included in the feature image information obtaining request for the one or more to-be-processed objects, and then, obtain the feature image information of the corresponding one or more to-be-processed objects according to the one or more object identifiers for the one or more to-be-processed objects, or, obtain the one or more identifiers for the one or more to-be-processed objects included in the feature image information obtaining request for the one or more to-be-processed objects and obtain the feature image information of the corresponding one or more to-be-processed objects based on the one or more object identifiers for the one or more to-be-processed objects.

At step 905, the image management terminal sends the feature image information of the one or more to-be-processed objects to the management platform.

At step 906, the management platform performs feature restoration processing for the one or more to-be-processed objects in the to-be-processed video according to the feature image information of the one or more to-be-processed objects.

In implementation, the management platform may perform feature restoration processing for the one or more to-be-processed objects in the to-be-processed video by referring to a corresponding feature removal method according to the obtained feature image information of the one or more to-be-processed objects. For example, a mosaic superimposed on the image regions corresponding to the feature image information of the one or more to-be-processed objects in the to-be-processed video may be removed. For another example, the pixel value or arrangement sequence of the pixel block of the image regions corresponding to the feature image information of the one or more to-be-processed objects in the to-be-processed video may be adjusted to be same as in the original video.

Figure 10:
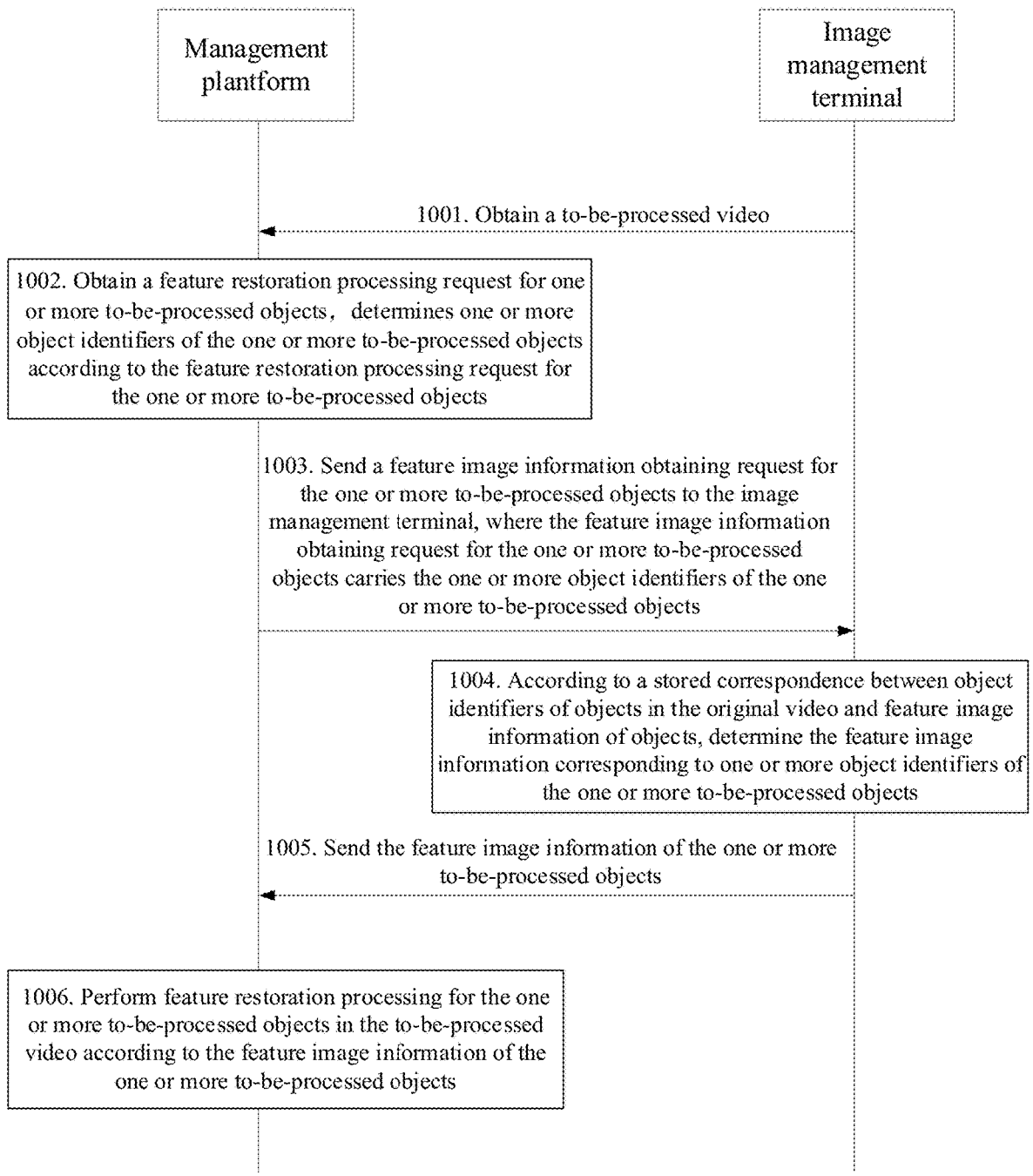
FIG. 10 is a flowchart illustrating a video processing method according to an embodiment of the present disclosure.

In combination with FIG. 10, the processing flow of the management platform and the image management terminal in the above system will be described below.

At step 1001, the management platform obtains a to-be-processed video.

At step 1002, the management platform obtains a feature restoration processing request for one or more to-be-processed objects, where the one or more to-be-processed objects are one or more of the objects having been subjected to feature removal processing; and determines one or more object identifiers for one or more to-be-processed objects according to the feature restoration processing request for the one or more to-be-processed objects.

In implementation, the management platform may obtain the feature restoration processing request for the one or more to-be-processed objects in many manners. For example, the management platform may display images of objects in the original video, and obtain a feature restoration processing request for one or more to-be-processed objects triggered by a selection operation for at least one target image. For another example, the management platform may obtain one or more images input by a user as the feature restoration processing request for the one or more to-be-processed objects; and for each of the one or more to-be-processed objects, determine an image having a maximum similarity with the image input by the user in the stored images as a target image; then, determine an object identifier for the to-be-processed object according to the above target image and a stored correspondence between object images and object identifiers. Furthermore, a feature identifier for the to-be-processed object may also be determined.

At step 1003, the management platform sends a feature image information obtaining request for the one or more to-be-processed objects to the image management terminal, where the feature image information obtaining request for the one or more to-be-processed objects includes the one or more object identifiers for the one or more to-be-processed objects.

In implementation, the management platform sends the feature image information obtaining request including the one or more object identifiers for the one or more to-be-processed objects to the image management terminal. The feature image information obtaining request may also include the one or more feature identifiers of the above one or more to-be-processed objects.

At step 1004, the image management terminal, according to a stored correspondence between object identifiers of objects in the original video and feature image information of objects, determines the feature image information corresponding to the one or more object identifiers of the one or more to-be-processed objects.

In implementation, the image management terminal extracts one or more object identifiers included in the feature image information obtaining request for the one or more to-be-processed objects. When the feature image information obtaining request for the one or more to-be-processed objects further includes the one or more feature identifiers of the one or more to-be-processed objects, the image management terminal may also extract the one or more feature identifiers of the one or more to-be-processed objects. Afterwards, for each of the one or more to-be-processed objects, the image management terminal may determine the feature image information corresponding to both the object identifier and the feature identifier of the to-be-processed object as the feature image information of the to-be-processed object.

At step 1005, the image management terminal sends the feature image information of the one or more to-be-processed objects to the management platform.

At step 1006, the management platform performs feature restoration processing for the one or more to-be-processed objects in the to-be-processed video according to the feature image information of the one or more to-be-processed objects.

Figure 11:
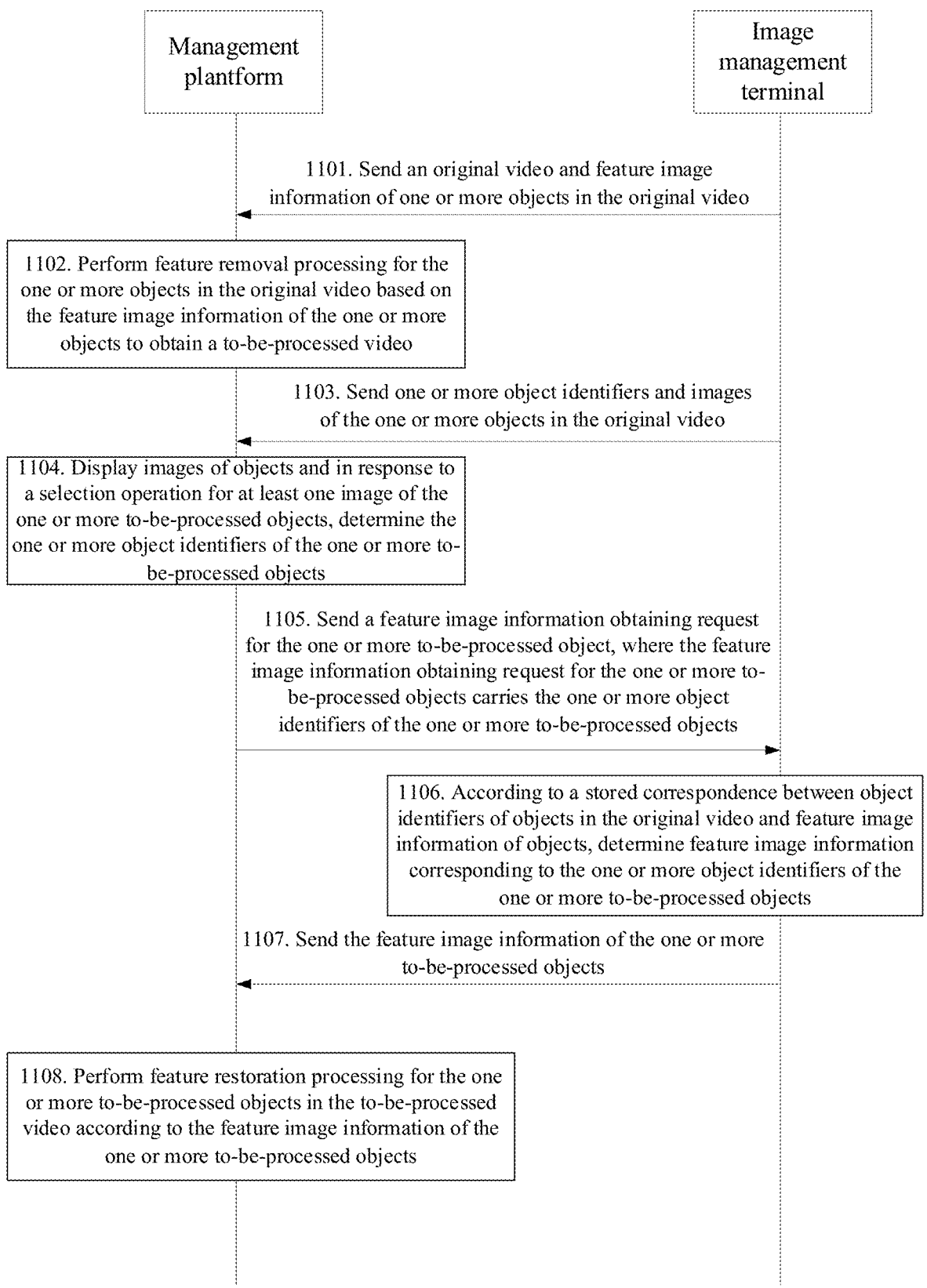
FIG. 11 is a flowchart illustrating a video processing method according to an embodiment of the present disclosure.

In combination with FIG. 11, the processing flow of the management platform and the image management terminal in the above system will be described below.

At step 1101, the image management terminal sends an original video and feature image information of objects in the original video to the management platform.

In implementation, the management platform may request the original video from the image management terminal and the image management terminal may perform processings such as object recognition, object matching and feature recognition for the original video firstly to obtain the one or more feature images information of the one or more objects in the original video, and then send the original video and the feature image information of the one or more objects in the original video together to the management platform.

At step 1102, the management platform performs feature removal processing for the one or more objects in the original video based on the feature image information of the one or more objects to obtain a to-be-processed video.

In implementation, the management platform may perform feature removal processing for the one or more objects in the original video according to the received feature image information of the one or more objects to obtain the to-be-processed video. The feature removal processing herein may be superimposing a mosaic video or adjusting pixel value or arrangement sequence of pixel blocks.

It is noted that the image management terminal may also perform feature removal processing for the one or more objects in the original video and send a feature-removed video directly to the management platform, and thus the management platform obtains the to-be-processed video.

At step 1103, the image management terminal sends one or more object identifiers and images of the one or more objects in the original video to the management platform.

At step 1104, the management platform displays images of objects and in response to a selection operation for the one or more images for the one or more to-be-processed objects, determines the one or more object identifiers for the one or more to-be-processed objects.

At step 1105, the management platform sends a feature image information obtaining request for the one or more to-be-processed objects to the image management terminal, where the feature image information obtaining request for the one or more to-be-processed objects includes the one or more object identifiers for the one or more to-be-processed objects.

At step 1106, the image management terminal, according to a stored correspondence between object identifier of object and feature image information of object in the original video, determines feature image information corresponding to the one or more object identifiers of the one or more to-be-processed objects.

At step 1107, the image management terminal sends the feature image information of the one or more to-be-processed objects to the management platform.

At step 1108, the management platform performs feature restoration processing for the one or more to-be-processed objects in the to-be-processed video according to the feature image information of the one or more to-be-processed objects.

It is noted that, the system embodiments and the processing flow corresponding to the system are based on the same idea as the embodiments of the above video processing method and the specific implementation can be referred to the embodiments of the video processing method and will not be repeated herein.

Based on the same technical idea, an embodiment of the present disclosure further provides a video processing system including a management platform and an image management terminal.

The management platform is configured to: obtain an original video; obtain a feature removal processing request for one or more to-be-processed objects, wherein the one or more to-be-processed objects are at least one object in the original video; according to the feature removal processing request for the one or more to-be-processed objects, send a feature image information obtaining request for the one or more to-be-processed objects to the image management terminal, wherein feature image information of one of the one or more to-be-processed objects includes pixel position information of all or part of features of the one of the one or more to-be-processed objects in the original video; obtain the feature image information for the one or more to-be-processed objects sent by the image management terminal; according to the feature image information of the one or more to-be-processed objects, perform feature removal processing for the one or more to-be-processed objects in the original video.

The image management terminal is configured to: obtain the feature image information obtaining request for the one or more to-be-processed objects; according to the feature image information obtaining request for the one or more to-be-processed objects, determine the feature image information for the one or more to-be-processed objects; send the feature image information of the one or more to-be-processed objects to the management platform.

In a possible implementation, the management platform is configured to:

according to the feature removal processing request for the one or more to-be-processed objects, determine one or more object identifiers of the one or more to-be-processed objects; and send the feature image information obtaining request for the one or more to-be-processed objects to the image management terminal, where the feature image information obtaining request for the one or more to-be-processed objects includes one or more object identifiers of the one or more to-be-processed objects;

wherein the image management terminal is configured to, according to a stored correspondence between object identifiers of objects in the original video and feature image information of the objects, determine the feature image information corresponding to one or more object identifiers of the one or more to-be-processed objects, and send the feature image information corresponding to one or more the object identifiers of the one or more to-be-processed objects to the management platform.

In a possible implementation, the management platform is configured to:

display images of the objects, where the objects are in the original video; obtain the feature removal processing request for the one or more to-be-processed object triggered by a selection operation for at least one target image; obtain at least one object identifier for the at least one target image as one or more object identifiers of the one or more to-be-processed objects; or, obtain the feature removal processing request for the one or more to-be-processed objects, where the feature removal processing request for the one or more to-be-processed objects includes at least one image including the one or more to-be-processed objects; and for each of the one or more to-be-processed objects, in the stored images of the objects, the objects being in the original video, determine a target image having a maximum similarity with the image including to-be-processed object and obtain an object identifier for the target image as an object identifier of the to-be-processed objects; or, display the original video; obtain the feature removal processing request for the one or more to-be-processed object triggered by a selection operation for at least one target image region in the original video; according to a stored correspondence between object identifiers and image regions, take at least one object identifier corresponding to the at least one target image region as one or more the object identifiers of the one or more to-be-processed objects.

In a possible implementation, the management platform is configured to:

obtain a feature identifier of the one or more to-be-processed objects;

wherein the feature image information obtaining request for the one or more to-be-processed objects further includes one or more feature identifiers of the one or more to-be-processed objects;

wherein the image management terminal is configured to:

according to a stored correspondence between object identifiers of objects in the original video, feature identifiers of the objects and feature image information of the objects, for each of the one or more to-be-processed objects, determine the feature image information corresponding to both the object identifier of the to-be-processed object and the feature identifier of the to-be-processed object.

Figure 12:
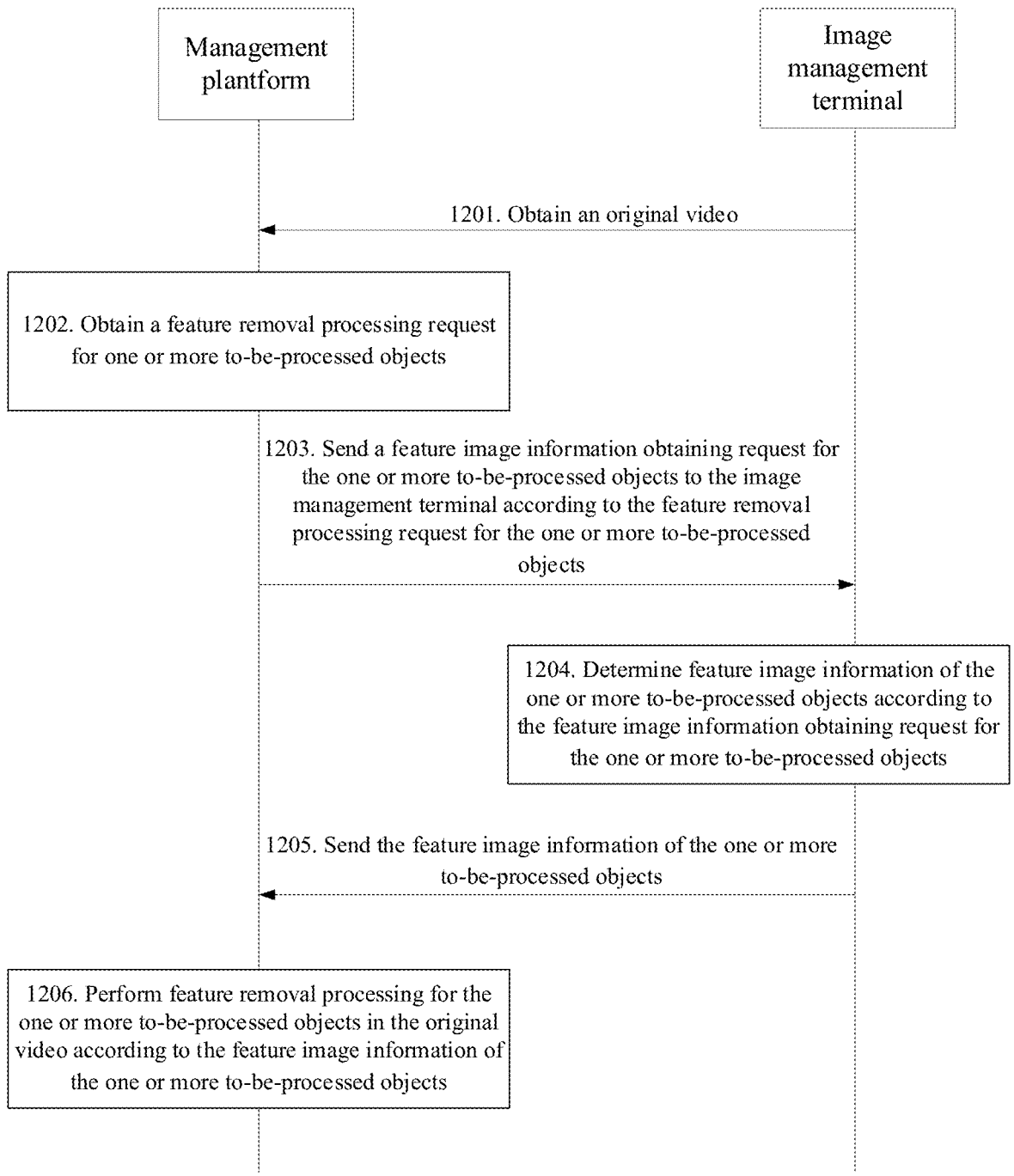
FIG. 12 is a flowchart illustrating a video processing method according to an embodiment of the present disclosure.

In combination with FIG. 12, the processing flow of the management platform and the image management terminal in the above system will be described below.

At step 1201, the management platform obtains an original video.

In implementation, the management platform may obtain the original video from the image management terminal, where the original video may be a video not subjected to feature removal processing or a video with one or more objects having been subjected to feature removal processing.

At step 1202, the management platform obtains a feature removal processing request for one or more to-be-processed objects.

In implementation, the management platform may obtain the feature removal processing request for the one or more to-be-processed objects in many manners. For example, the management platform may display images of objects, where the objects being in the original video, and obtain a feature removal processing request for one or more to-be-processed objects triggered by a selection operation for at least one target image. For another example, the management platform may display the original video and obtain a feature removal processing request for one or more to-be-processed objects triggered by a selection operation for at least one target image region in the original video. For another example, the management platform may obtain one or more images input by a user as the feature removal processing request for the one or more to-be-processed objects.

At step 1203, the management platform sends a feature image information obtaining request for the one or more to-be-processed objects to the image management terminal according to the feature removal processing request for the one or more to-be-processed objects.

In implementation, the management platform may, after obtaining the feature removal processing request for the one or more to-be-processed objects, directly send the feature image information obtaining request for the one or more to-be-processed objects to the image management terminal based on the feature removal processing request. Herein, due to different manners of obtaining the feature removal processing request for the one or more to-be-processed objects, the information included in the sent feature image information obtaining request may also be different. For example, when the management platform obtains the feature removal processing request for one or more to-be-processed objects triggered by a selection operation for at least one target image, or obtains the feature removal processing request for one or more to-be-processed objects by obtaining one or more images input by a user, the feature image information obtaining request may include one or more images for the one or more to-be-processed objects. For another example, when the management platform obtains the feature removal processing request one or more to-be-processed objects triggered by a selection operation for at least one target image region in the original video, the feature image information obtaining request may include the at least one target image region. Preferably, the management platform may determine an identifier for the one or more to-be-processed objects based on the obtained feature removal processing request for the one or more to-be-processed objects and the feature image information obtaining request sent by the management platform to the image management terminal may include the one or more identifiers of the one or more to-be-processed objects.

At step 1204, the image management terminal determines feature image information of the one or more to-be-processed objects according to the feature image information obtaining request for the one or more to-be-processed objects.

In implementation, the image management terminal may determine one or more object identifiers for the one or more to-be-processed objects according to the image for the one or more to-be-processed objects or the at least one target image region included in the feature image information obtaining request for the one or more to-be-processed objects, and then, obtain the feature image information of the corresponding one or more to-be-processed objects according to the one or more object identifiers for the one or more to-be-processed objects, or, obtain the one or more identifiers for the one or more to-be-processed objects included in the feature image information obtaining request for the one or more to-be-processed objects and obtain the feature image information of the corresponding one or more to-be-processed objects based on the one or more object identifiers for the one or more to-be-processed objects.

At step 1205, the image management terminal sends the feature image information of the one or more to-be-processed objects to the management platform.

At step 1206, the management platform performs feature removal processing for the one or more to-be-processed objects in the original video according to the feature image information of the one or more to-be-processed objects.

In implementation, the management platform may perform feature removal processing for the one or more to-be-processed objects in the original video according to the obtained feature image information of the one or more to-be-processed objects. For example, a mosaic image is superimposed on an image region corresponding to the feature image information of the one or more to-be-processed objects in the original video. For another example, the pixel value or arrangement sequence of the pixel block of the image region corresponding to the feature image information of the one or more to-be-processed objects in the original video may be adjusted.

Figure 13:
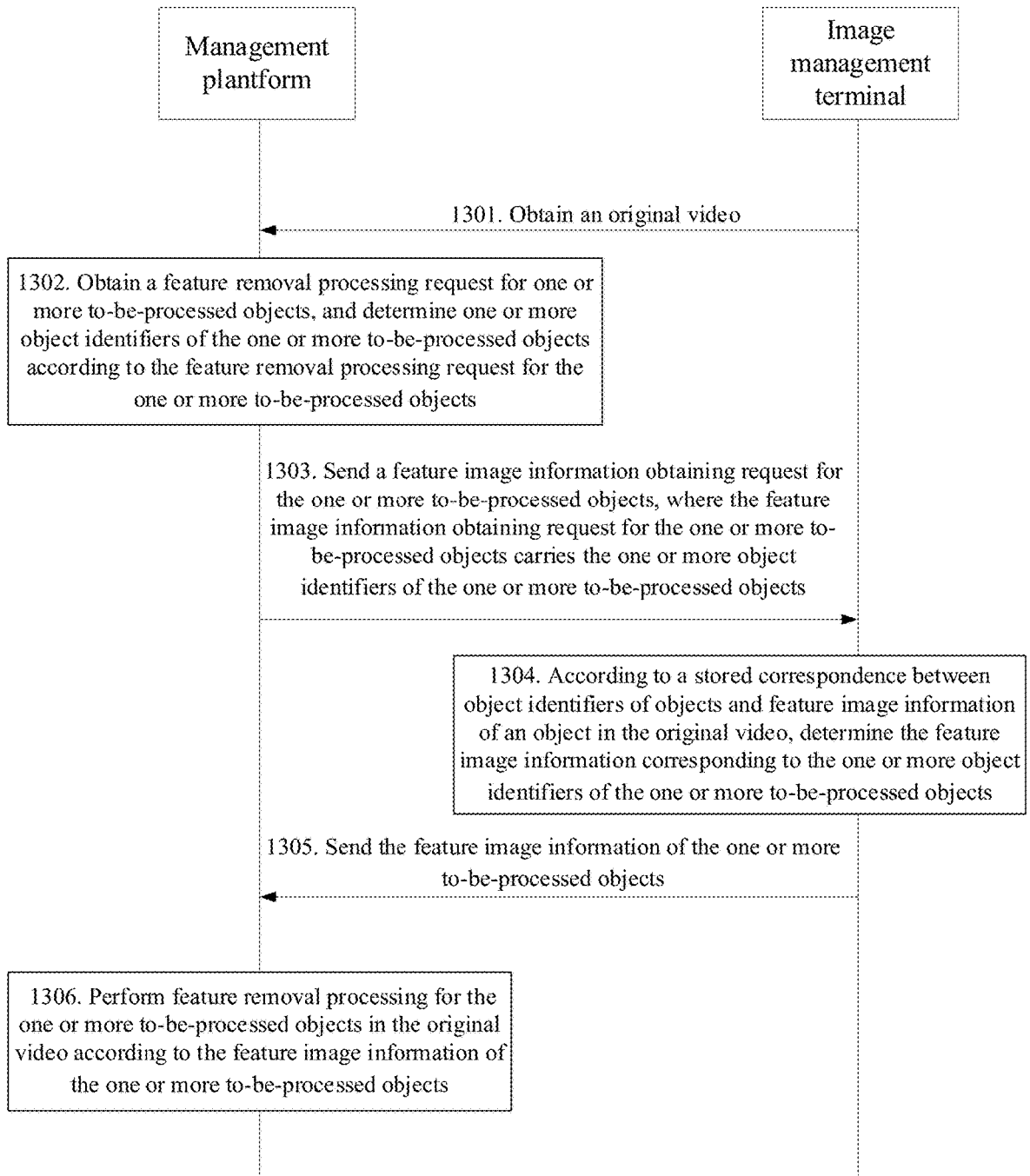
FIG. 13 is a flowchart illustrating a video processing method according to an embodiment of the present disclosure.

In combination with FIG. 13, the processing flow of the management platform and the image management terminal in the above system will be described below.

At step 1301, the management platform obtains an original video.

At step 1302, the management platform obtains a feature removal processing request for one or more to-be-processed objects, and determines one or more object identifiers for the one or more to-be-processed objects according to the feature removal processing request for the one or more to-be-processed objects.

In implementation, the management platform may obtain the feature removal processing request for the one or more to-be-processed objects in many manners. For example, the management platform may display images of objects in the original video, and obtain a feature removal processing request for one or more to-be-processed objects triggered by a selection operation for at least one target image. For another example, the management platform may obtain an images input by a user as the feature removal processing request for the one or more to-be-processed objects; and for each of the one or more to-be-processed objects, determine an image having a maximum similarity with the image input by the user in the stored images as a target image; then, determine an object identifier for the to-be-processed object according to the above target image and a stored correspondence between object image and object identifier. Furthermore, a feature identifier for the to-be-processed object may also be determined.

At step 1303, the management platform sends a feature image information obtaining request for the one or more to-be-processed objects to the image management terminal where the feature image information obtaining request for the one or more to-be-processed objects includes one or more object identifiers of the one or more to-be-processed objects.

In implementation, the management platform sends the feature image information obtaining request including the one or more object identifiers for the one or more to-be-processed objects to the image management terminal, where the feature image information obtaining request may also include the one or more feature identifiers for the one or more to-be-processed objects.

At step 1304, the image management terminal, according to a stored correspondence between object identifiers of objects in the original video and feature image information of objects, determines the feature image information corresponding to the one or more object identifiers of the one or more to-be-processed objects.

The image management terminal extracts one or more object identifiers included in the feature image information obtaining request for the one or more to-be-processed objects. When one or more feature identifiers for the one or more to-be-processed objects are included, the image management terminal may also extract the one or more feature identifiers of the one or more to-be-processed objects at the same time. Afterwards, for each of the one or more to-be-processed objects, the image management terminal may determine the feature image information corresponding to both the object identifier and the feature identifier of the to-be-processed object as the feature image information of the to-be-processed object.

At step 1305, the image management terminal sends the feature image information of the one or more to-be-processed objects to the management platform.

At step 1306, the management platform performs feature removal processing for the one or more to-be-processed objects in the original video according to the feature image information of the one or more to-be-processed objects.

Figure 14:
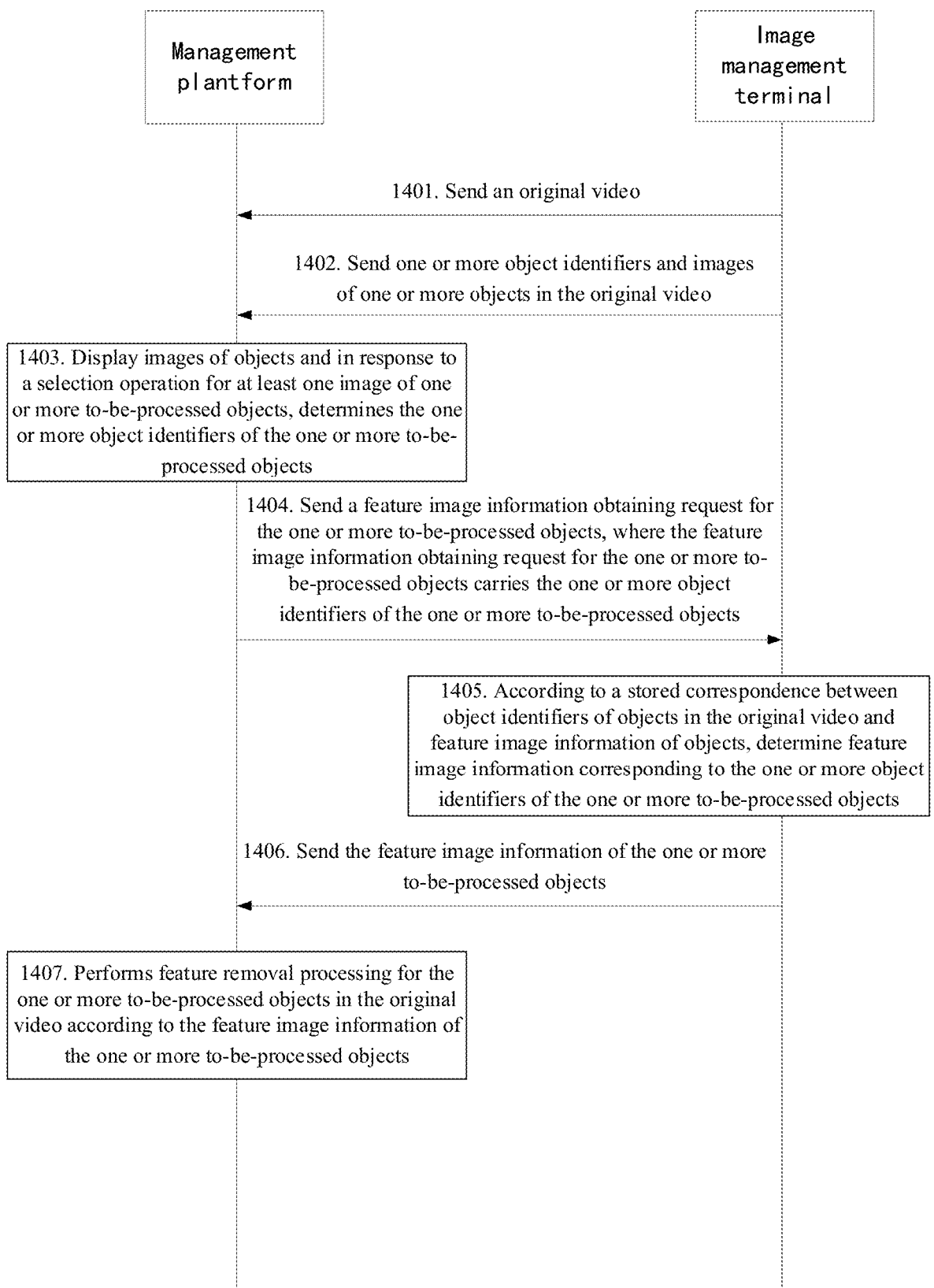
FIG. 14 is a flowchart illustrating a video processing method according to an embodiment of the present disclosure.

In combination with FIG. 14, the processing flow of the management platform and the image management terminal in the above system will be described below.

At step 1401, the image management terminal sends an original video to the management platform.

At step 1402, the image management terminal sends an object identifier and an image of an object in the original video to the management platform.

In implementation, the image management terminal may perform processings such as object recognition, object matching and feature recognition for the original video, allocate a same object identifier to a same object in the original video and obtain an image of the object, and then send the image of the object and the corresponding object identifier to the management platform.

At step 1403, the management platform displays images of objects and in response to a selection operation for one or more images of one or more to-be-processed objects, determines one or more object identifier for the one or more to-be-processed objects.

At step 1404, the management platform sends a feature image information obtaining request for the one or more to-be-processed objects to the image management terminal, where the feature image information obtaining request for the one or more to-be-processed objects includes the one or more object identifiers for the one or more to-be-processed objects.

At step 1405, the image management terminal, according to a stored correspondence between object identifiers of object and feature image information of objects in the original video, determines feature image information corresponding to the one or more object identifiers for the one or more to-be-processed objects.

At step 1406, the image management terminal sends the feature image information of the one or more to-be-processed objects to the management platform.

At step 1407, the management platform performs feature removal processing for the one or more to-be-processed objects in the original video according to the feature image information of the one or more to-be-processed objects.

It is noted that, the system embodiments and the processing flow corresponding to the system are based on the same idea as the embodiments of the above video processing method and the specific implementation can be referred to the embodiments of the video processing method and will not be repeated herein.

In an illustrative embodiment, there is further provided a computer readable storage medium, storing at least one instruction, where the at least one instruction is located and executed by a processor to implement the video processing method according to any one of the above embodiments. For example, the computer readable storage medium may be a Read Only Memory (ROM), a Random Access Memory (RAM), CD-ROM, magnetic tape, floppy disk and optical data storage device and the like.

In an illustrative embodiment, there is further provided a computer program product, where an instruction in the computer program product is loaded and executed by a processor in a computer device to implement the video processing method according to any one of the above embodiments.

Persons of ordinary skill in the art may understand that the implementation of all or part of the steps of the above embodiments can be achieved by use of hardware, or by instructing relevant hardware using program, where the program may be stored in a computer readable storage medium. The above storage medium may be a Read Only Memory (ROM), magnetic disk or compact disk or the like.

The above descriptions are made only to some embodiments of the present disclosure and are not intended to limit the present disclosure. Any modifications, equivalent substitutions and improvements made within the spirit and principle of the present disclosure shall fall within the scope of protection of the present disclosure.

The invention claimed is:

1. A video processing method, applied to a management platform, comprising:

obtaining a to-be-processed video, wherein the to-be-processed video is obtained by performing feature removal processing for objects in an original video;

obtaining a feature restoration processing request for one or more to-be-processed objects, wherein the one or more to-be-processed objects are a part of the objects having been subjected to feature removal processing;

according to the feature restoration processing request for the one or more to-be-processed objects, obtaining feature image information corresponding to the one or more to-be-processed objects, wherein the feature image information of one of the one or more to-be-processed objects comprises pixel position information of all or part of features of the one of the one or more to-be-processed objects in the original video; and according to the feature image information of the one or more to-be-processed objects, performing feature restoration processing for the one or more to-be-processed objects in the to-be-processed video, thereby no need to perform feature recovery on all of the objects having been subjected to feature removal processing but only for the one or more to-be-processed objects.

2. The method of claim 1, wherein according to the feature restoration processing request for the one or more to-be-processed objects, obtaining the feature image information corresponding to the one or more to-be-processed objects comprises:

according to the feature restoration processing request for the one or more to-be-processed objects, determining one or more object identifiers of the one or more to-be-processed objects; and obtaining the feature image information corresponding to the one or more object identifiers of the one or more to-be-processed objects.

3. The method of claim 2, wherein obtaining the feature restoration processing request for the one or more to-be-processed objects and determining the one or more object identifiers of the one or more to-be-processed objects according to the feature restoration processing request for the one or more to-be-processed objects comprise:

displaying images of the objects, wherein the objects in the original video have been subjected to the feature removal processing; obtaining the feature restoration processing request for the one or more to-be-processed objects triggered by a selection operation for at least one target image; obtaining at least one object identifier for the at least one target image as one or more object identifiers of the one or more to-be-processed objects; or, obtaining the feature restoration processing request for the one or more to-be-processed objects, wherein the feature restoration processing request for the one or more to-be-processed objects includes at least one image including the one or more to-be-processed objects; and for each of the one or more to-be-processed objects, in stored images of objects, the objects being in the original video, determining a target image having a maximum similarity with the image including the to-be-processed object and obtaining an object identifier for the target image as an object identifier of the to-be-processed object; or, displaying the to-be-processed video; obtaining the feature restoration processing request for the one or more to-be-processed objects triggered by a selection operation for at least one target image region in the to-be-processed video; according to a stored correspondence between object identifiers and image regions, determining at least one object identifier corresponding to the at least one target image region as one or more object identifiers of the one or more to-be-processed objects.

4. The method of claim 2, wherein before obtaining the feature image information corresponding to the one or more object identifiers of the one or more to-be-processed objects, the method further comprises:
    obtaining one or more feature identifiers of the one or more to-be-processed objects;
    wherein obtaining the feature image information corresponding to the one or more object identifiers of the one or more to-be-processed objects comprises:
    for each of the one or more to-be-processed objects, obtaining the feature image information corresponding to both of the object identifier of the to-be-processed object and the feature identifier of the to-be-processed object.

5. The method of claim 2, wherein obtaining the feature image information corresponding to the one or more object identifiers of the one or more to-be-processed objects comprises:
    according to a stored correspondence between object identifiers of objects in the original video and feature image information of the objects, determining the feature image information corresponding to the one or more object identifiers of the one or more to-be-processed objects; or,
    sending the one or more object identifiers of the one or more to-be-processed objects to an image management terminal, such that the image management terminal determines the feature image information corresponding to the one or more object identifiers of the one or more to-be-processed objects according to a stored correspondence between object identifiers of objects in the original video and feature image information of the objects; and receiving the feature image information corresponding to the one or more object identifiers of the one or more to-be-processed objects sent by the image management terminal.

6. The method of claim 1, further comprising:
    obtaining an account identifier of a target user account currently logging into the management platform;
    wherein before according to the feature image information of the one or more to-be-processed objects, performing feature restoration processing for the one or more to-be-processed objects in the to-be-processed video, the method further comprises:
    determining a target processing authority corresponding to the account identifier of the target user account;
    wherein according to the feature image information of the one or more to-be-processed objects, performing feature restoration processing for the one or more to-be-processed objects in the to-be-processed video comprises:
    in response to that the target processing authority is capable of processing the feature restoration processing request for the one or more to-be-processed objects, according to the feature image information of the one or more to-be-processed objects, performing feature restoration processing for the one or more to-be-processed objects in the to-be-processed video.

7. A computer device, comprising a processor and a memory, wherein the memory stores at least one instruction and the at least one instruction is loaded and executed by the processor to implement the video processing method according to claim 1.

8. A non-transitory computer readable storage medium, storing at least one instruction, wherein the at least one instruction is loaded and executed by a processor to implement the video processing method according to claim 1.

9. A video processing method, applied to a management platform, comprising:
    obtaining an original video;
    obtaining a feature removal processing request for one or more to-be-processed objects, wherein the one or more to-be-processed objects are partial objects in the original video;
    according to the feature removal processing request for the one or more to-be-processed objects, obtaining feature image information corresponding to the one or more to-be-processed objects, wherein the feature image information of one of the one or more to-be-processed objects comprises pixel position information of all or part of features of the one of the one or more to-be-processed objects in the original video; and
    according to the feature image information of the one or more to-be-processed objects, performing feature removal processing for the one or more to-be-processed objects in the original video, thereby no need to perform feature removal for all objects in the original video but only for the partial objects in the original video.

10. The method of claim 9, wherein according to the feature removal processing request for the one or more to-be-processed objects, obtaining the feature image information corresponding to the one or more to-be-processed objects comprises:
    according to the feature removal processing request for the one or more to-be-processed objects, determining one or more object identifiers of the one or more to-be-processed objects; and
    obtaining feature image information corresponding to the one or more object identifiers of the one or more to-be-processed objects.

11. The method of claim 10, wherein obtaining the feature removal processing request of the one or more to-be-processed objects and determining one or more object identifiers of the one or more to-be-processed objects according to the feature removal processing request for the one or more to-be-processed objects comprise:
    displaying images of objects, wherein the objects are in the original video; obtaining the feature removal processing request for the one or more to-be-processed objects triggered by a selection operation for at least one target image; obtaining at least one object identifier for the at least one target image as one or more object identifiers of the one or more to-be-processed objects; or,
    obtaining the feature removal processing request for the one or more to-be-processed objects, wherein the feature removal processing request for the one or more to-be-processed objects includes at least one image including the one or more to-be-processed objects; and for each of the one or more to-be-processed objects, in stored images of the objects, the objects being in the original video, determining a target image having a maximum similarity with the image including the to-be-processed object and obtaining an object identifier for the target image as an object identifiers of the to-be-processed object; or,
    displaying the original video; obtaining the feature removal processing request for the one or more to-be-processed objects triggered by a selection operation for at least one target image region in the original video; according to a stored correspondence between object identifiers and image regions, determining at least one object identifier corresponding to the at least one target image region as one or more object identifiers of the one or more to-be-processed objects.

12. The method of claim 10, wherein obtaining the feature image information corresponding to the one or more object identifiers of the one or more to-be-processed objects comprises:
according to a stored correspondence between object identifiers of objects in the original video and feature image information of the objects, determining the feature image information corresponding to one or more object identifiers of the one or more to-be-processed objects; or,
sending one or more object identifiers of the one or more to-be-processed objects to an image management terminal, such that the image management terminal determines the feature image information corresponding to one or more object identifiers of the one or more to-be-processed objects according to a stored correspondence between object identifiers of objects in the original video and feature image information of the objects; and receiving the feature image information corresponding to the one or more object identifiers of the one or more to-be-processed objects sent by the image management terminal.

13. The method of claim 9, wherein obtaining the feature removal processing request for the one or more to-be-processed objects comprises:
displaying images of objects in the original video; obtaining the feature removal processing request for the one or more to-be-processed objects triggered by a selection operation for at least one target image; or
displaying the original video; obtaining the feature removal processing request for the one or more to-be-processed objects triggered by a selection operation for at least one target image region in the original video.

14. A computer device, comprising a processor and a memory, wherein the memory stores at least one instruction and the at least one instruction is loaded and executed by the processor to implement the video processing method according to claim 9.

15. A non-transitory computer readable storage medium, storing at least one instruction, wherein the at least one instruction is loaded and executed by a processor to implement the video processing method according to claim 9.

16. A video processing system, comprising a management platform and an image management terminal, wherein,
the management platform is configured to:
obtain a to-be-processed video, wherein the to-be-processed video is obtained by performing feature removal processing for objects in an original video;
obtain a feature restoration processing request for one or more to-be-processed objects, wherein the one or more to-be-processed objects are a part of the objects having been subjected to feature removal processing;
according to the feature restoration processing request for the one or more to-be-processed objects, send a feature image information obtaining request for the one or more to-be-processed objects to the image management terminal, wherein the feature image information of one of the one or more to-be-processed objects comprises pixel position information of all or part of features of the one of the one or more to-be-processed objects in the original video;
obtain the feature image information of the one or more to-be-processed objects sent by the image management terminal; and
according to the feature image information of the one or more to-be-processed objects, perform feature restoration processing for the one or more to-be-processed objects in the to-be-processed video, thereby no need to perform feature recovery on all of the objects having been subjected to feature removal processing but only for the one or more to-be-processed objects;
the image management terminal is configured to:
obtain the feature image information obtaining request for the one or more to-be-processed objects;
according to the feature image information obtaining request for the one or more to-be-processed objects, determine the feature image information for the one or more to-be-processed objects; and
send the feature image information of the one or more to-be-processed objects to the management platform.

17. The system of claim 16, wherein the management platform is configured to:
according to the feature restoration processing request for the one or more to-be-processed objects, determine one or more object identifiers of the one or more to-be-processed objects and
send the feature image information obtaining request for the one or more to-be-processed objects to the image management terminal, wherein the feature image information obtaining request for the one or more to-be-processed objects includes one or more object identifiers of the one or more to-be-processed objects;
wherein the image management terminal is configured to:
according to a stored correspondence between object identifiers of objects in the original video and feature image information of the objects, determine the feature image information corresponding to one or more object identifiers of the one or more to-be-processed objects;
send the feature image information corresponding to the one or more object identifiers of the one or more to-be-processed objects to the management platform.

18. The system of claim 17, wherein the management platform is configured to:
display images of the objects, wherein the objects are in the original video; obtain the feature restoration processing request for the one or more to-be-processed objects triggered by a selection operation for at least one target image; obtain at least one object identifier for the at least one target image as one or more object identifiers of the one or more to-be-processed objects; or,
obtain the feature restoration processing request for the one or more to-be-processed objects, wherein the feature restoration processing request for the one or more to-be-processed objects includes at least one image including the one or more to-be-processed objects; and for each of the one or more to-be-processed objects, in stored images of the objects, the objects being in the original video, determine a target image having a maximum similarity with the image including the to-be-processed object and obtain an object identifier for the target image as an object identifier of the to-be-processed object; or,
display the to-be-processed video; obtain the feature restoration processing request for the one or more to-be-processed objects triggered by a selection operation for at least one target image region in the to-be-processed video; according to a stored correspondence between object identifiers and image regions, determine at least one object identifier corresponding to the at least one target image region as one or more object identifiers of the one or more to-be-processed objects.

19. The system of claim 17, wherein the management platform is further configured to:
   obtain one or more feature identifiers of the one or more to-be-processed objects;
   wherein the feature image information obtaining request for the one or more to-be-processed objects further includes one or more feature identifiers of the one or more to-be-processed objects;
   wherein the image management terminal is configured to:
   according to a stored correspondence between object identifiers of objects in the original video, feature identifiers of the objects and feature image information of the objects, for each of the one or more to-be-processed objects, determine the feature image information corresponding to both of the object identifier of the to-be-processed object and the feature identifier of the to-be-processed object.

20. The system of claim 17, wherein the management platform is configured to:
   according to a stored correspondence between object identifiers of objects in the original video and feature image information of the objects, determine the feature image information corresponding to the one or more object identifiers of the one or more to-be-processed objects; or,
   send the one or more object identifiers of the one or more to-be-processed objects to the image management terminal and receive the feature image information corresponding to the one or more object identifiers of the one or more to-be-processed objects sent by the image management terminal;
   wherein the image management terminal is configured to, according to the stored correspondence between object identifiers of the objects in the original video and feature image information of the objects, determine the feature image information corresponding to the one or more object identifiers of the one or more to-be-processed objects and send the feature image information corresponding to the one or more object identifiers of the one or more to-be-processed objects to the management platform.

* * * * *